United States Patent [19]

Bittorf et al.

[11] Patent Number: 4,876,664

[45] Date of Patent: Oct. 24, 1989

[54] PROGRAMMABLE CONTROLLER WITH A DUAL INTERMODULE MESSAGE SYSTEM

[75] Inventors: Bradley J. Bittorf, Shaker Heights; Mark A. Flood; Michael D. Kalan, both of Mayfield Heights; Robert R. Sepsi, Richmond Heights, all of Ohio

[73] Assignee: Allen-Bradley Company, Inc., Milwaukee, Wis.

[21] Appl. No.: 89,572

[22] Filed: Aug. 26, 1987

[51] Int. Cl.⁴ .................................................. G06F 15/46
[52] U.S. Cl. .................................. 364/900; 364/926.9; 364/949; 364/967.2
[58] Field of Search ............... 364/900 MS File, 131, 364/133, 134, 200 MS File

[56] References Cited

U.S. PATENT DOCUMENTS 3,364,472 1/1968 Sloper .
4,128,876 12/1978 Ames et al. .
4,293,924 10/1981 Struger et al. .
4,302,820 11/1981 Struger et al. .
4,338,675 7/1982 Palmer et al. .
4,413,319 11/1983 Schultz et al. .
4,442,504 4/1984 Dummermuth et al. .
4,504,927 3/1985 Callan .
4,628,436 12/1986 Okamoto et al. .
4,648,064 3/1987 Morley .

Primary Examiner—Thomas M. Heckler
Attorney, Agent, or Firm—Quarles & Brady

[57] ABSTRACT

A programmable controller suitable for operating a machine to carry out a plurality of programmed functions includes a plurality of program processors each being operable to execute simultaneously a different control program that directs the programmable controller to operate the machine to perform specific functions. Each of the processors includes a memory having areas for receiving different priority level messages. Each area has an addressable location corresponding to each module in the controller that can send messages. A message may be an executable command or a pointer to an address block containing the message or message access parameters.

11 Claims, 16 Drawing Sheets

SYSTEM CONTROLLER
MEMORY

REMOTE I/O SCANNER MODULE

PROGRAM EXECUTION
PROCESSOR MODULE P1

PROGRAM EXECUTION
PROCESSOR MODULE P2

SYSTEM INITIALIZATION

MAIL MESSAGE TRANSMITTAL

SIMULTANEOUS DESCRIPTOR ROUTINE

PROGRAMMABLE CONTROLLER WITH A DUAL INTERMODULE MESSAGE SYSTEM

The field of the invention is programmable controllers such as those described in U.S. Pat. Nos. 3,810,118; 3,942,158; 4,165,534; and 4,442,504.

BACKGROUND OF THE INVENTION

Programmable controllers are typically connected to industrial equipment such as assembly lines and machine tools to sequentially operate the equipment in accordance with a stored program. In programmable controllers such as those disclosed in the above cited patents, for example, the control program is stored in a memory and includes instructions which are read out in rapid sequence and executed to examine the condition of selected sensing devices on the controlled equipment, or to energize or de-energize selected operating devices on the controlled equipment contingent upon the status of one or more of the examined sensing devices.

Large programmable controllers consist of a number of modules with different functions assigned to each module. For example, one module may execute the user control program, another may interface the controller to the remote sensing and operating devices, and yet another module may control communications with a host computer via a local area network. The modules are typically housed in a rack and are interconnected by a series of buses on the backplane of the rack.

During the execution of the control programs, data is exchanged between modules within the programmable controller by sending addresses and control signals over the backplane buses. A previous technique for exchanging this data is described in U.S. Pat. No. 4,442,504 entitled "Modular Programmable Controller." In this technique a set of module status blocks was stored in a central memory module for the controller. When one module sought to send a message to another module, the sending module created a message parameter block in its memory containing the address of the message, its length and other parameters needed for the recipient to obtain and process the message. The sending module then accessed the central memory and stored the address of the parameter block and an identification of the sender in the status block for the recipient module.

The recipient module then was sent an interrupt indicating that a message was waiting. In response thereto the recipient module accessed the central memory and read the information from its status block. The recipient module then read the parameter block from the sending module's memory and used the parameters to obtain the message.

This technique worked well for programmable controllers with a single processor module. However, a controller has been developed which has several processor modules capable of simultaneously executing user control programs. In this system more data is exchanged over the backplane and access time to the backplane is more valuable. The previous message communication technique required numerous backplane accesses to transfer the message.

SUMMARY OF THE INVENTION

A programmable controller executes a single machine operation program enabling a machine to carry out a plurality of programmed functions. Each step of the machine operation program is defined as a separate user control program. The programmable controller includes a plurality of individual processor modules each of which is capable of simultaneously executing a user defined control program. A storage means is provided to store the control programs and data indicating the sequence in which the control programs are to be executed. The programmable controller also includes one or more input/output (I/O) modules for interfacing it to sensors and actuators on the controlled machine. These I/O modules may interface the controller to the sensors and actuators directly or indirectly through remote I/O adapters. The modules are housed in a rack and are interconnected by a set of buses on the rack's backplane.

The present programmable controller provides a system for exchanging data messages between the functional modules within the programmable controller. Each of these modules has a mechanism for obtaining access to the common backplane in order to transmit data to the other modules. A memory is provided in each module for receiving message information from other modules. The memory is divided into separate areas for messages of two priority levels. Each area has a memory location designated to receive message information for each one of the other modules.

The module sending the message accesses the appropriate memory location in the recipient module and stores information regarding the message. This information may be a command which the recipient can immediately execute without additional data, or the information may be a pointer to a memory location in the sending module that containing the message data or parameters enabling the recipient to access the message data.

An object of the present invention is to provide a technique for sending messages of different priority levels. This enables the recipient module to distinguish between messages requiring immediate attention and those that can wait until the recipient has time available. A further object is to provide a mechanism for sending short commands which the recipient is able to immediately execute without any additional intermodule communication.

Another object of the instant invention is to enable commands to be readily exchanged between the plurality of program execution modules to coordinate the processing of the various user control programs. This object is to be carried out while also providing a system for exchanging conventional data among the modules.

BRIEF DESCRIPTION OF THE DRAWINGS

In the drawings which illustrate the embodiments of the present invention.

DETAILED DESCRIPTION OF THE INVENTION

Figure 1:
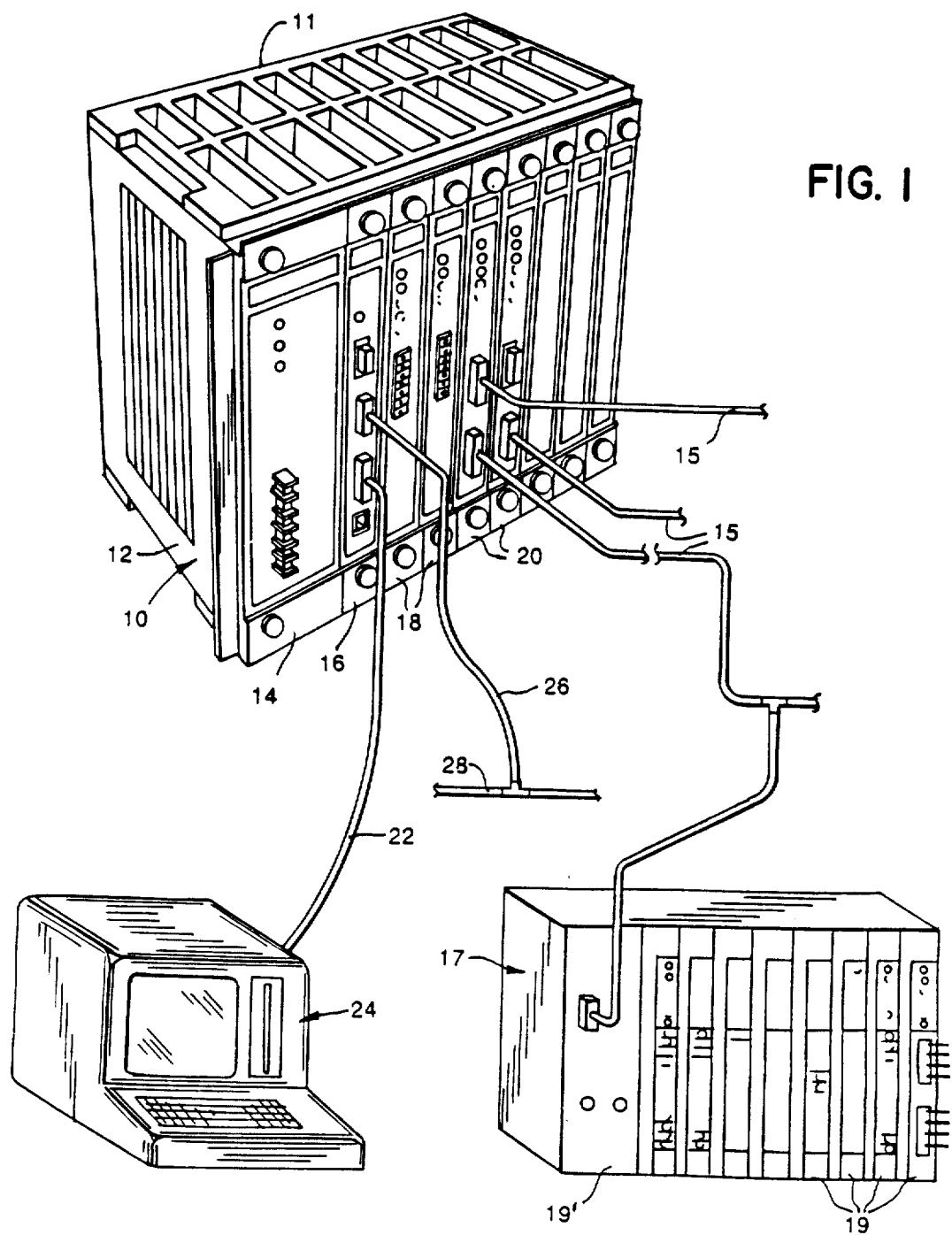
FIG. 1 is a perspective view of a programmable controller which employs the present invention.

With initial reference to FIG. 1, a programmable controller 10 of the present invention is housed in a rack 12 which includes a series of slots that receive a plurality of printed circuit board modules. These functional modules connect to a mother board which extends along the back surface of the rack 12 to provide a backplane 11. The backplane 11 has a plurality of module connectors which are interconnected by a conductive pattern on the backplane. The backplane 11 provides a series of signal buses to which the modules connect. The rack 12 contains a power supply module 14, a system controller 16, a number of program execution processor modules 18 and a plurality of remote input/output (I/O) scanner modules 20, although only one scanner module is required. The remaining locations in rack 12 are empty and the slots are covered by blank plates until additional functional modules are to be inserted in these slots. The physical construction of the rack 12 is disclosed in U.S. Pat. No. 4,716,495 filed on Sept. 22, 1986, and assigned to the same assignee as the present invention.

Up to four remote I/O scanner modules 20 interface the controller 10 to external remote I/O racks 17 via serial I/O data links, such as link 15. Each remote I/O rack 17 has a plurality of local I/O modules 19 which are coupled to individual sensors and actuators on the controlled equipment. The local I/O modules 19 may take many forms and may include, for example, D.C. inputs or outputs, A.C. inputs or outputs, analog inputs or outputs, and open or closed loop positioning modules. The I/O racks 17 and networks 15 employ conventional interface and communication technology. The remote I/O rack 17 also contains an adapter module 19'; such as the one described in U.S. Pat. No. 4,413,319, which controls the transmission of data via the I/O network 15 between the I/O modules 19 and the scanner modules 20.

The system controller 16 is connected through cable 25 to a programming terminal 24, which is used to load the user programs into the programmable controller and configure its operation, as well as monitor its performance. The terminal 24 is a personal computer programmed to enable the user to develop the control programs on the terminal, which programs are then downloaded into the programmable controller. Once the programs have been loaded into the programmable controller 10 and its operation debugged, the terminal 24 may be disconnected from the system controller 16 if further monitoring is not required. The system controller 16 may be also connected via a cable 26 to a local area network 28 over which it may receive data and programming instructions, as well as issue status information and report data to a host computer. This enables a central host computer or central terminal to program and control the operation of a plurality of programmable controllers on a factory floor.

Different steps of a function chart program are assigned to various ones of the program execution modules 18. The user control program for each step is stored in the local memory of the corresponding program execution module 18. For example the user control program may be a conventional ladder program. Several user control programs may be executed simultaneously on different ones of the program execution modules. At other times a "background task" may be executed on one program execution module 18 while another module 18 executes a user control program.

During the course of carrying out a user control program, the program execution module 18 reads input status data from the input image tables in one or more of the I/O scanner modules 20. As called for by the program instructions, the program execution module also writes output state data to the output image table in the I/O scanning module 20 that services the respective output device. Access to the I/O tables is obtained via the rack backplane 11.

When a program execution module completes a function chart step, it sends a command to the program execution module 18 containing the next step to be executed. The command identifies the next step and instructs that program execution module 18 to begin executing it.

Hardware

Figure 2:
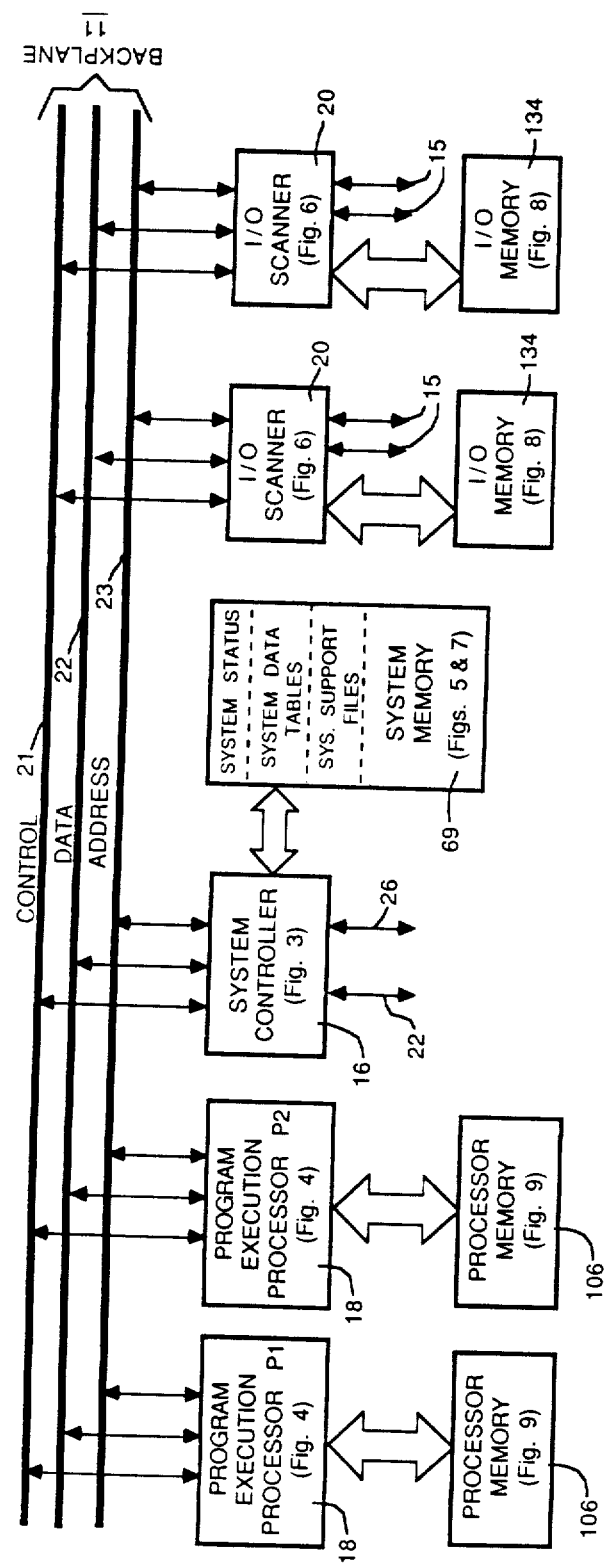
FIG. 2 is a schematic block diagram of the programmable controller system shown in FIG. 1.

In order for the data and commands to be transfered among the modules of the programmable controller, the modules are interconnected as shown in FIG. 2.

Each of the blocks in FIG. 2 contains a reference to other Figures of the drawings that contain the details of the component represented by the block. Each of the modules is connected to the rack backplane 11 which consists of separate control, data and address buses, 21-23 respectively. The control bus 21 consists of a number of separate lines to which a module may connect to depending upon the control signals required for that type of module. The data bus 22 is thirty-two bits wide and the address bus is 27 bits wide.

In the preferred embodiment, each of the system controller 16, program execution processor modules 18 and remote I/O scanner modules 20 includes a removable daughter board containing a local memory for data and operating instructions for that module. The daughter board contains a battery to sustain the memory when power is removed from the controller. The memory 134 in each remote I/O scanner module contains an I/O image table that indicates the state of each of the sensor devices and the desired state of each of the controlled actuators connected to the scanner module 20. The system controller's memory 69 contains various segments that store data regarding the system status and configuration as well as information relating to specific system operations. Each of the processor modules 18 have a random access memory 106 which stores the function chart data, user control programs and their operating variables.

Each of the functional modules of the programmable controller 10 will be described in detail in the following sections.

System Controller

As noted previously, the system controller module 16 provides a communication interface for the programmable controller to external terminals and local area networks. The system controller 16 also performs system housekeeping functions, such as providing an indication of the system status and supervising access to the backplane 11.

During normal operation of the programmable controller, the system controller takes care of communication with the external devices that are connected to it, such as network 28 and programming terminal 24. The most significant task is communicating with the terminal 24 to provide information allowing the operator to monitor the system performance and to detect faulty sensors or actuators. Another task supervised by the system controller is the exchange of data with a host computer or a peer programmable controller via the local area network 28. This enables the host computer to collect statistics from one or a number of programmable controllers regarding their operation. In addition to these functions another function the system controller 16 receives all programming changes and sees to it that the program in the corresponding program execution module 18 is updated. For example, this includes adding, deleting and changing various rungs of the ladder program.

Figure 3:
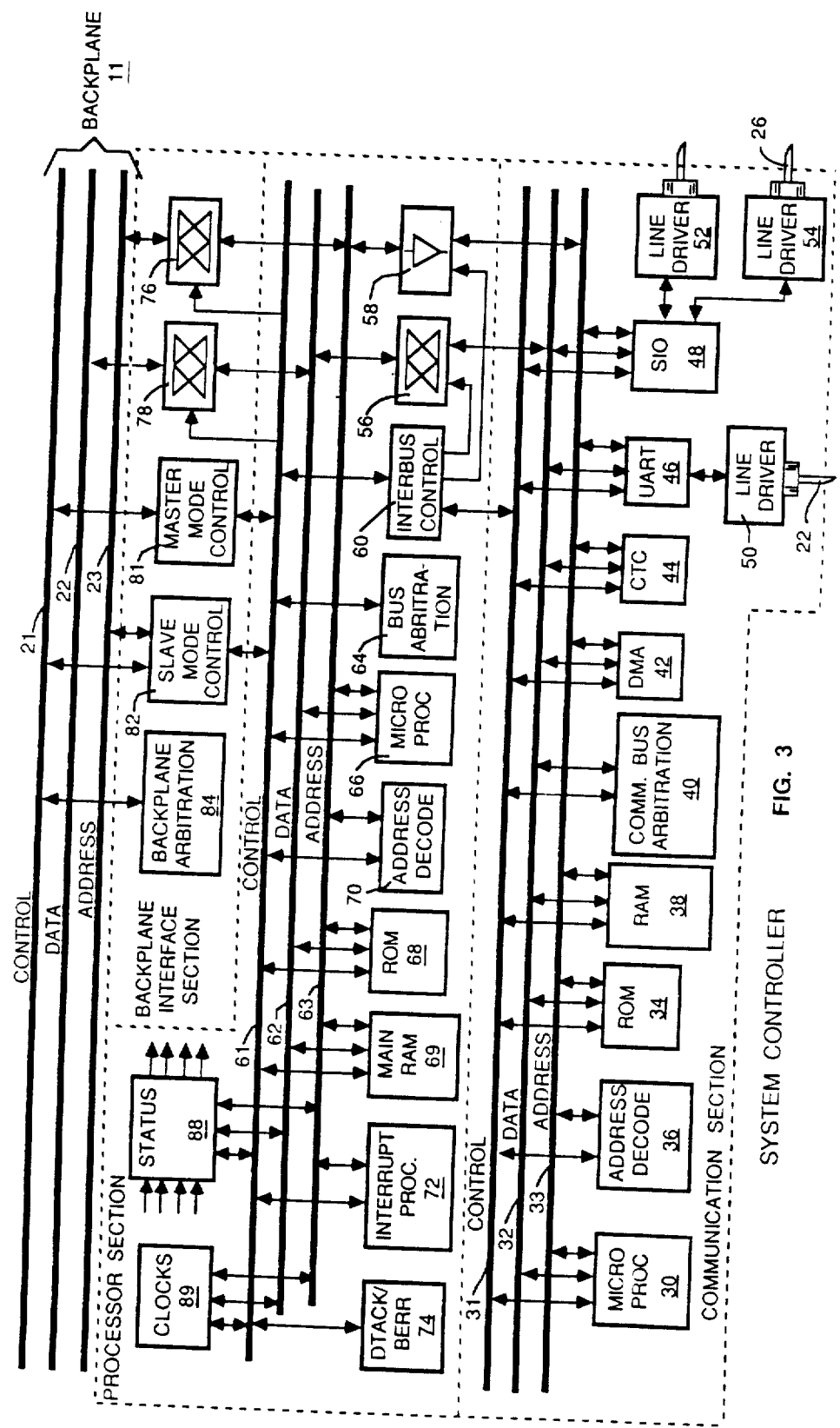
FIG. 3 is a schematic block diagram of the System Controller for the programmable controller of FIG. 2.

The system controller as shown schematically in FIG. 3 connects to the backplane buses 21–23 and is divided into three sections (delineated by dashed lines) for backplane interface, processing and communication operations. The backplane interface section supervises the backplane access for all the rack modules and interfaces the controller module 16 to the backplane 11. The processor section executes a supervisory program for the controller 10. The communication section is primarily responsible for communicating with external terminal 24 and local area networks, such as LAN 28. Each of the processor and communication sections includes a set of internal buses, communication buses 31–33 and processor buses 61–63 respectively.

Various circuits connected to the communication buses control the interfacing of the system controller 16 to the programming terminal 24 and the local area network 28. The communication buses consist of control bus 31 having a number of individual control lines running between various components in the communication section, an eight bit wide data bus 32 and a sixteen bit wide address bus 33. The communication section is built around a microprocessor 30, such as the model Z80 manufactured by Zilog, Incorporated. The microprocessor 30 executes machine language instructions which are stored in a read-only memory (ROM) 34. The instructions are fetched from the ROM, decoded and then executed by the microprocessor 30 to carry out the communication functions. The program controlling these functions is similar to that employed in previous programmable controllers.

A conventional address decoding circuit 36 receives each address issued by the microprocessor 30 and decodes it to produce the proper set of signals on control lines 31. For example, if the microprocessor 30 is accessing the ROM 34, the address decode circuit 36 will recognize that the address sent by the microprocessor 30 on bus 33 is within the range of addresses at which the ROM is located. Once it has recognized which device in the communications section is to be accessed, the address decode circuit 36 produces control signals for the device to carry out the access.

Two serial input/output devices, UART 46 and serial input/output controller (SIO) 48, are also connected to the three communication buses 31–33. The UART 46 may by any of several commercially available universal asynchronous receiver/transmitter integrated circuits. The UART 46 converts the parallel data which is present on the communication data bus 32 into a properly formatted serial signal which is fed to an input/output line driver/receiver 50. The line driver 50 provides output signals corresponding to any one of several serial signal standards, such as RS232, RS423 or RS422. The serial I/O communication controller 48 may be any of several commercially available integrated circuits which service two synchronous serial communication channels. The SIO 48 interfaces the communication section of the system controller 16 to local area networks connected to the line drivers 52 and 54, such as network 28 of FIG. 1. The programming terminal 24, shown in FIG. 1, is connected to one of these line driver 52 or 54.

Also located within the communication section is a random access memory (RAM) 38 for temporary storage of data received from or to be sent to the various external devices connected to the system controller. The RAM 38 may be accessed via address bus 33 so that data may be written into or read from the memory via bus 32 depending upon enabling signals from control bus 31. RAM 38 incorporates a parity circuit which analyzes each digital byte being stored in the RAM and produces a parity bit using conventional techniques. This parity bit is employed to check the integrity of the data read from the random access memory 38. A direct memory access (DMA) circuit 42 is provided to enable rapid data exchange between the SIO 48 and the RAM 38 during the communication process. The DMA circuit 42 allows the SIO 48 to access RAM 38 to store or obtain data which have been received or will be transmitted over their respective external communication channels.

Access to the communication buses 31–33 is controlled by an arbitration circuit 40 which resolves conflicts when several devices request access to these buses at the same time. The arbitration circuit 40 determines which component of the communication section will have access to the shared buses 31–33. A device seeking the buses sends a request signal to the arbitration circuit 40 via a line of the control bus 31 and the arbitration circuit grants the request to one device at a time by producing an access signal on another control line for that device.

A counter/timer circuit (CTC) 44 connects to the communication buses 31–33 and to an interrupt terminal on microprocessor 30 in order to process interrupt requests from the other components within the communications section. The CTC 44 is also configured as a timer to produce an interrupt request to the microprocessor 30 at a given periodic interval, such as every 10 milliseconds, so that various routines may be periodically executed regardless of the task then being performed by microprocessor 30. In response to an interrupt request from the CTC 44, the microprocessor 30 reads a vector from the CTC 44 directing the microprocessor to the appropriate interrupt service routine stored in ROM 34, such as performing a data I/O request from either UART 46 or SIO 48.

Referring still to FIG. 3, the processor section is linked together by a set of buses that comprise control lines 61, a sixteen bit data bus 62 and a twenty-three bit address bus 63. Access to these buses is controlled by an arbitration circuit 64 similar to circuit 40 on the communication buses. Two sets of data gates 56 and 58 extend between the communication buses 32 and 33 and processor buses 62 and 63 of the system controller module 16. Specifically, the first set of gates 56 provides an eight bit bidirectional connection of the communication section data bus 32 to the data bus 62 of the processor section; and the second set of gates 58 connects the two address buses 33 and 63. The data gate 56 consists of two sets of eight individual tri-state data gates, each set controlling data flow in one direction between the two buses 32 and 62. Only the lower eight lines of the processor data bus 62 are coupled to the eight bit communication section data bus 32. As addressing will only occur from the processor section to the communication section, address gates 58 consist of one set of sixteen tri-state signal gates coupling the sixteen communication address bus lines 33 to the lower sixteen address lines in the processor section. An interbus control circuit 60 is connected to control lines 61 and 31 from the processor and the communication sections, respectively, and in response to access request signals from arbitration circuits 40 and 64, the control circuit 60 enables the data and address buffers 56 and 58.

The processor section is built around a sixteen-bit microprocessor 66, such as a model 68010 manufactured by Motorola Inc., which executes program code stored in read only memory 68. The 68010 microprocessor is essentially a memory mapped device and does not have any input/output lines directly connected to it. Therefore, its access to other components on the processor bus must be accomplished through issuing addresses on bus 63. The address sent from the microprocessor 66 is decoded in an address decode circuit 70 to produce the proper control signals for the accessed component. The processor address decoder 70 functions in much the same manner as the communication section address decoder circuit 36. The processor section also contains an interrupt processor 72 which controls interrupts to the microprocessor 66 and provides the proper instruction address vectors.

A data transfer acknowledge and bus error (DTACK/BERR) circuit 74 is also connected to the processor control bus 61. Circuit 74 responds to signals from the various components in the processor section to acknowledge the completion of a data transfer and issue bus error signals in the event of improper addressing or failure of data transfer. These signals are acted on by the microprocessor 66 which takes corrective action. The processor section also includes clock circuit 89 that contains the main system clock and a real time clock. A system status circuit 88 receives input signals related to the status of the entire system 10 and provides an indication of that status.

The main random access memory (RAM) 69 for the system controller 16 is also connected to the processor buses 61–63. The RAM 69 is a static memory containing 393,216 (384K) memory locations each of which is 16 bits wide and serves as the system memory for the entire controller 10. The system memory 69 can be directly accessed via the backplane 11 by other modules in the system without the intervention of the central processing unit 66 within the system controller.

Figure 7:
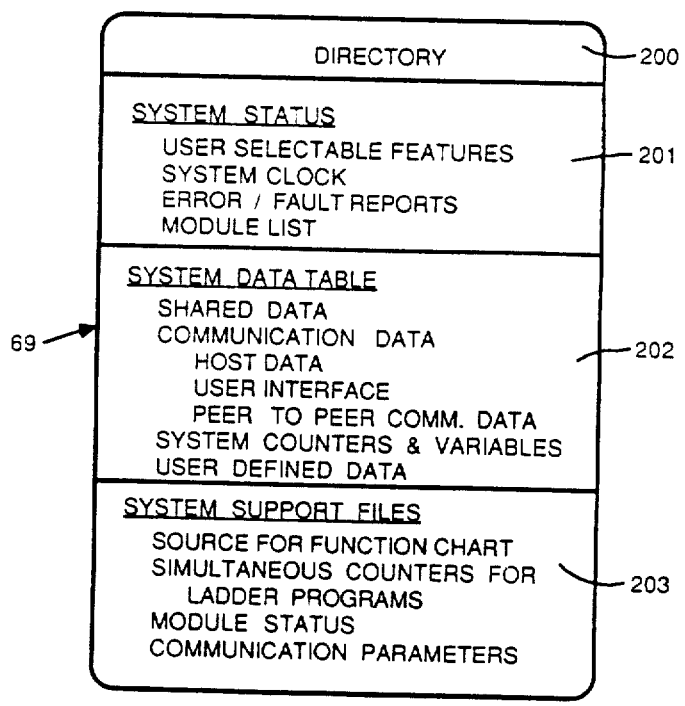
FIG. 7 is a diagram of the System Controller memory data structure.

FIG. 7 illustrates the data structures within the main system memory 69 included in the system controller module 16. The system memory 69 stores separate data files, which contain data for performing specific functions during the operation of the programmable controller. The data structures include various forms of data such as integers, floating point numbers, ASCII characters, and various control structures. The first file 200 is a directory of the other files stored in the system controller memory 69. The remaining memory is divided into a system status file 201, system data table 202 and a set of system support files 203.

The system status file 201 contains data relating to the configuration of the entire programmable controller 10. Included in this file is information identifying the various user selectable features of the programmable controller that have been enabled by the system operator. The real time clock data regarding the time of day, month, day and year are also included in this portion of the system memory. Digital words indicating the occurrence and type of various system faults and errors, as well as pointers indicating the program instruction being executed when the fault occurs are stored within another sub-file of this section. A section of the system status file 201 also lists the number and type of all the active modules on the system as well as the relative module number and address pointers necessary to access each module. For example, if more than one program processor module 18 or remote I/O scanner module 20 is present in rack 12, the user must assign a unique number via a thumb wheel on the module to distinguish the various modules of that type. The thumb wheel setting is read by the system controller during initial start-up of the system and stored in this portion of the system status file 201.

The system data table 202 contains data that is shared by more than one module. For example, results of various computations from one program processor module 18 may be stored in this portion of the system memory so that other program processor modules may readily access the data. Memory space is allocated within the system data table 202 to store the data that was received or that will be transmitted via the various external communication links of the system controller's communication section. Other modules in the system 10 are directly able to access these storage locations.

The system data table 202 also contains the value of various system counters and variables which are either used by the system controller 16 or which are commonly used by a number of other modules such as program processor modules 18 or the I/O scanner modules 20. The final sub-file within the system data table 201 is a space allocated for the user defined data for various programs that the user has loaded into the programmable controller.

The final section 203 of the system controller main memory 69 is dedicated to the system support files. These files include the source program information for the function chart program. The programmable controller 10 does not directly execute the function chart program. However, as will be described later, the function chart is employed during the programming step to generate data which is used to direct the operation of the program execution modules 18. In order to permit the subsequent editing of these programs, a source version of the function chart must be available for display on the programming terminal. As also will be described hereinafter, the support files 203 contain simultaneous counters for execution of various branches of the function chart. Although the local memory in each module contains data regarding its status, in some instances these memories do not have a battery to sustain them. In order to retain such volatile information after a power shut-down, the status information for these modules is replicated in a sub-file of section 203 of the system memory 69.

Communication parameters are also stored in this section 203 for configuring the UART 46 and the serial I/O module 48 within the communication section of the system controller 16. Among other things these parameters include baud rate, word size and control bits for the serial data signal format. For example, parameters for communicating with the operator terminal 24 are stored in this portion of the system memory. In addition, as noted previously, a number of programmable controllers may be connected via the local area network 28, in which case, parameters must be provided in each controller instructing them how to communicate over the network.

Referring again to FIG. 3, the processor section of the system controller 16 interfaces with the backplane buses of rack 12 via a plurality of components that are coupled to both sets of buses. Specifically, the backplane data bus 22 is connected to the processor data bus 62 by a set of bidirectional data transmission gates 78 and the backplane address bus 23 is connected to the processor address bus 63 by another set of bidirectional gates 76. When the system controller 16 seeks to exercise control over the backplane 11 of the programmable controller 10, a master mode control circuit 81 responds to signals on the control lines of the processor bus 61 and issues the proper control signals over the backplane control bus 21 to access other modules within the rack 12.

When another module within the rack 12 seeks access to the system controller 16, in order to read the contents of main RAM 69, for example, the system controller becomes subordinate to the control of the backplane 11 by this other module. In this circumstance, a slave mode control circuit 82 within the system controller 16 responds to the address of the system controller that appears on the backplane address bus 23 and to control signals on the control lines of the backplane bus 21 which lead from the other module. In response the slave mode control 82 issues signals to transmission gates 76 and 78 enabling the other backplane module to access the system controller 16. In this latter instance, the master mode control circuit 81 is in a dormant state. The two bus gates 76 and 78 receive enabling control signals from the master or slave mode control circuits 81 and 82 via the lines of control bus 61 depending upon the mode of backplane communication. A backplane arbitration circuit 84 supervises access to the backplane and resolves conflicting requests for access from the modules in the system.

As noted above the system controller module 16 executes programs which control the initialization of the system and communication with external computers. It does not execute the user control programs.

Program Execution Processor

Figure 4:
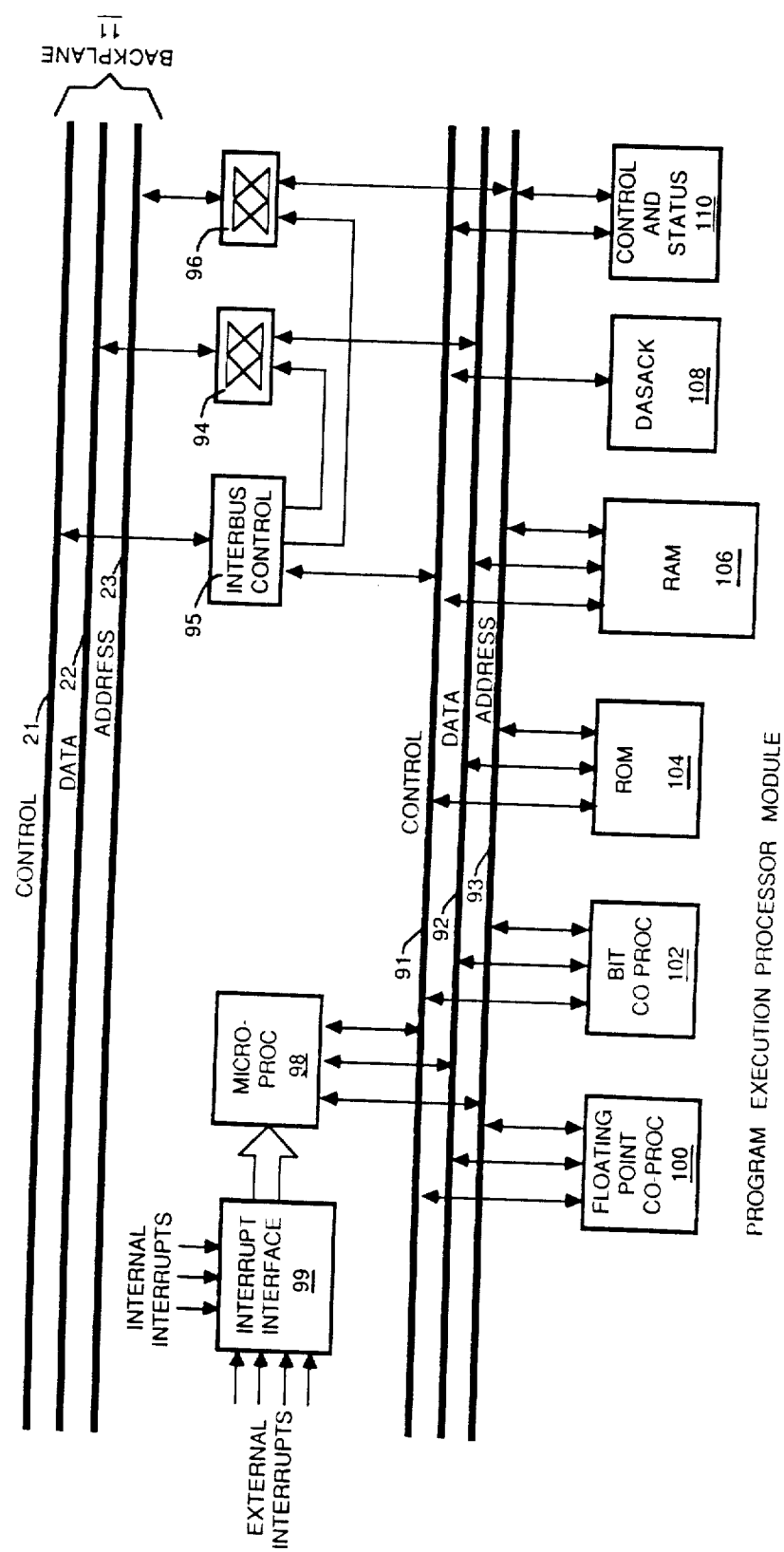
FIG. 4 is a schematic block diagram of a Program Execution Processor of the programmable controller shown in FIG. 2.

The program execution processor modules 18 store and execute specific user control programs, such as ladder programs. One of these modules is shown schematically in FIG. 4. During this execution the modules 18 read the state of the sensing devices from input image table in the memory 134 of the various I/O scanner modules 20, and write output data from its memory to the output image tables in the I/O scanner modules.

In order to perform these tasks, each processor module 18 has a set of internal buses 91–93 which are coupled to the backplane 11. Specifically the processor module 18 has a thirty-two bit internal data bus 92, a set of control lines 91 and a sixteen bit address bus 93. These are coupled to the data and address buses of the backplane 11 by respective set of tri-state, bidirectional transmission gates 94 and 96. The operation of these gates 94 and 96 is governed by an interbus control circuit 95 coupled to backplane control lines 21 and the module control lines 91. It should be noted that both the internal data bus 92 and the backplane data bus 22 are thirty-two bits wide. Therefore, thirty-two bit data from the processor module 18 can be sent over the backplane as one thirty-two bit word if the recipient module has a thirty-two bit wide data bus. In some processing functions the module 18 operates on sixteen bit data, and in such case sixteen-bit words are applied to the backplane 11.

The remaining components of the processor module 18 are connected to the internal buses 91–93. These internal buses are driven by a microprocessor 98, which is a thirty-two bit microprocessor sold commercially by Motorola, Inc. as the 68020 microprocessor. The microprocessor 98 has an interrupt port which is coupled to an interrupt interface circuit 99. This interface circuit receives signals from four external interrupt lines connected to terminals on the front of the processor module 18. These external interrupt lines permit devices which sense high priority events, to be interfaced directly to the processor module for fast response. Three other interrupt lines on the interface circuit 99 connect to circuits within the processor module 18. A signal on any of these external or internal interrupt lines causes the microprocessor 98 to immediately interrupt normal program execution and execute a routine that corresponds to that interrupt line. The user may program the routines for the external interrupts, but the internal interrupts are serviced by dedicated interrupt service routines.

The processing capability of the processor module 18 is also supported by a floating point co-processor 100, and by a bit co-processor 102. The floating point co-processor 100 is commercially available from Motorola, Inc. as the 6881, and it is specifically designed to work with the 68020 microprocessor 98. The bit co-processor 102 is a custom integrated circuit for carrying out Boolean logic operations on individual bits of the data words. Bit co-processors have been used in programmable controllers in the past to execute a set of ladder diagram instructions using hardwired logic as described in co-pending U.S. patent application Ser. No. 717,221 filed on Mar. 28, 1985 and entitled "Programmable Controller with Function Chart Interpreter". The three processors 98, 100 and 102 operate in tandem to execute specific types of instructions included in the control program. The microprocessor 98 may begin execution of the control program and when it encounters a floating point arithmetic function, the floating point co-processor 100 is enabled and the microprocessor 98 relinquishes the internal buses 91–93 to it. The floating point co-processor 100 takes over the processing function until the arithmetic operation is complete at which time the microprocessor 98 resumes program execution. If the control program calls for bit processing (i.e. contains an instruction in the set for the bit co-processor 102), the microprocessor immediately relinquishes control to the bit co-processor 102 by writing the address of the control program instruction into a program counter in the bit co-processor 102. The bit co-processor 102 then removes the microprocessor 98 from the internal buses 91–93 and executes the subsequent control program instructions until a stop instruction is encountered. At this point the bit co-processor 102 signals the microprocessor 98 via the control bus 91 to resume control of the buses and execution of the control program. Approximately 85–90 percent of a typical control program of the "ladder" type may be executed by the bit co-processor 102. The operation of the custom Boolean logic bit co-processor 102 in conjunction with a microprocessor is fully described in above-cited copending U.S. patent application Ser. No. 717,221.

The processor module 18 includes a data size acknowledge (DASACK) circuit 108. This circuit provides a two-bit code on two of the control bus lines which indicates the "width" of the data on the data bus 92. As will be described in more detail below, this data may be a long word consisting of thirty-two bits, a regular sixteen bit word, or a single eight bit byte. This data size information is used by the various module components in this data processing.

The final component of the processor module 18 is a control and status circuit 110 which monitors the status of the processor module and provides proper control signals on various lines of the control bus 91 to enable various components in a conventional manner.

Both a read only memory (ROM) 104 and a read-write random access memory (RAM) 106 are connected to all three internal buses 91–93 within the processor module 18. The ROM 104 contains 16 bit storage locations for instructions and constants for the three processors 98, 100, and 102. The RAM 106 provides storage for the operands and the results of the various computations performed by the processor module 18. The control programs to be executed by the module 18 are also contained in its RAM 106.

Figure 5:
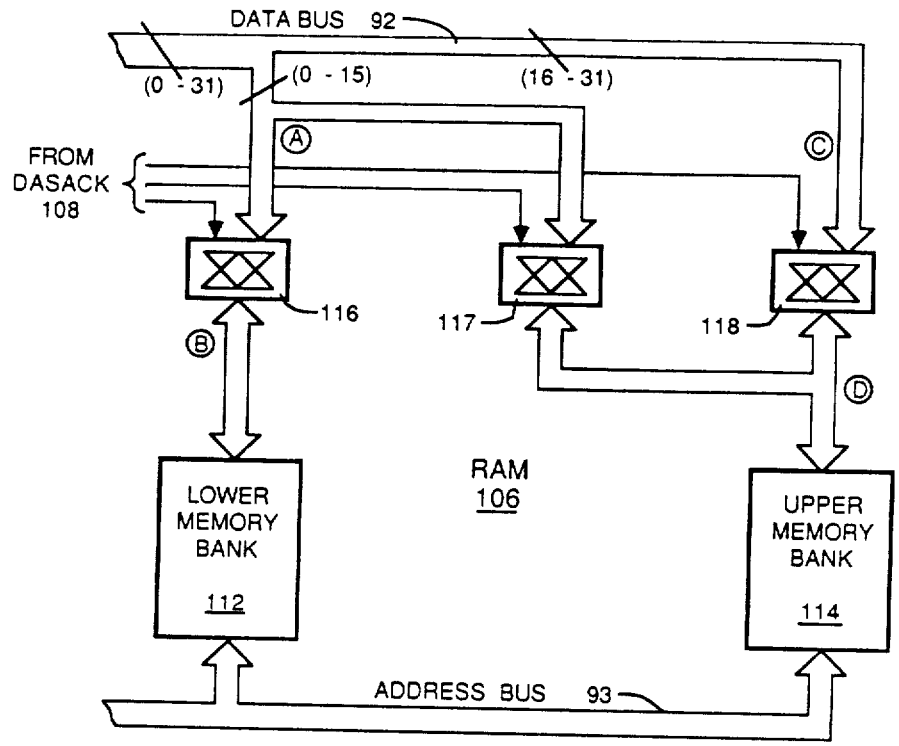
FIG. 5 is a schematic block diagram of the random access memory of the Program Execution Processor of FIG. 4.

The details of the RAM memory 106 are shown in FIG. 5. The random access memory 106 is divided into lower and upper banks 112 and 114. Each bank contains a number of storage locations, for example 196,608 (192K) memory addresses. The memory location in each bank is sixteen bits wide and both banks can be enabled simultaneously to provide storage for thirty-two bit data words. As noted above the width of the data processed by the execution module 18 may be sixteen or thirty-two bits wide. In order to optimize the storage capacity when sixteen bit words are processed, a transmission gate multiplexer is incorporated into the random access memory 106 to allow separate sixteen bit words to be stored in both the upper and lower memory banks. Specifically, the multiplexer consists of three sets of tri-state bidirectional transmission gates 116–118, each of which provides bidirectional control of sixteen data lines. The first set of transmission gates 116 couples the sixteen uses. The memory location in each bank is sixteen bits wide and both banks can be enabled simulta-neously to provide storage for thirty-two bit data words. As noted above the width of the data processed by the execution module 18 may be sixteen or thirty-two bits wide. In order to optimize the storage capacity when sixteen bit words are processed, a transmission gate multiplexer is incorporated into the random access memory 106 to allow separate sixteen bit words to be stored in both the upper and lower memory banks. Specifically, the multiplexer consists of three sets of tri-state bidirectional transmission gates 116–118, each of which provides bidirectional control of sixteen data lines. The first set of transmission gates 116 couples the sixteen least significant bits (bits 0–15) of the data bus 92 to the data terminals of the lower memory bank 112. Similarly, the third set of transmission gates 118 couples the sixteen most significant bits (bits 16–31) of the data bus 92 to the data terminals of the upper memory bank 114. The second set of transmission gates 117 cross couples the sixteen least significant bits of the data bus to the data terminals of the upper memory bank 114. The three sets of transmission gates receive control signals from the DASACK 108 via control bus 91 which enables the various transmission gate sets depending upon the width and address of the word being sent on data bus 92. All of the address bus lines 93 go to each memory bank 112 and 114.

If thirty-two bits of data are being sent on the data bus 92, the DASACK 108 enables the first and third sets of transmission gates 116 and 118. This stores the sixteen least significant bits in the lower memory bank 112 and the sixteen most significant bits of the data in the upper memory bank 114. When a sixteen bit word is being sent on the data bus 92 it may be stored in either of the memory banks 112 or 114. If it is to be stored in the lower memory bank 112, the DASACK 108 enables only the first set of transmission gates 116 to pass the data to that memory bank. To maximize the storage capability for sixteen bit words, the separate data may also be stored at the same address in the upper memory bank 114, in which case DASACK 108 enables only the second set of transmission gates 117 which couples the sixteen least significant bits of data to the upper memory bank. When sixteen bits of data are being processed, the third set of transmission gates 118 is never enabled.

Figure 9:
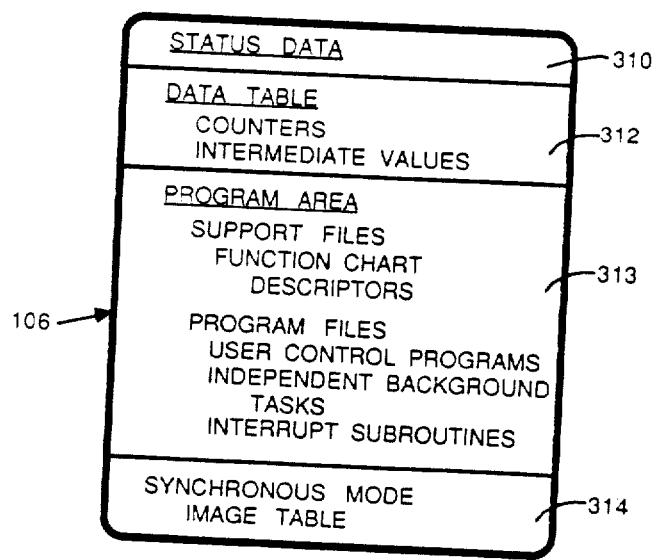
FIG. 9 is a diagram of the Program Execution Processor memory data structure.

FIG. 9 represents the data structure of the RAM memory 106 for each program execution processor module 18. The memory 106 includes a section 310 which contains status information regarding the module's operation. Each program execution processor module 18 also contains its own data table 312 which is stored in the RAM 106. The data table 312 includes memory locations for various counters, timers and intermediate computation values.

The largest share of the RAM memory 106 is devoted to storing the control programs. The actual program contents, as will be described in detail later, comprises compiled user control programs, independent background tasks and various interrupt routines to be processed by the processor modules 18. In order to properly carry out the user control programs, support files containing the function chart data, called "descriptors," are also contained within the program area 313.

In one mode of operation of the program execution processor module 18, referred to herein as the "synchronous mode", the processor module 18 periodically copies the entire input image table from the I/O scanner module 20 into its own memory 106. Space for this copy of the I/O image table is provided in memory section 314.

Remote I/O Scanner Module

Figure 6:
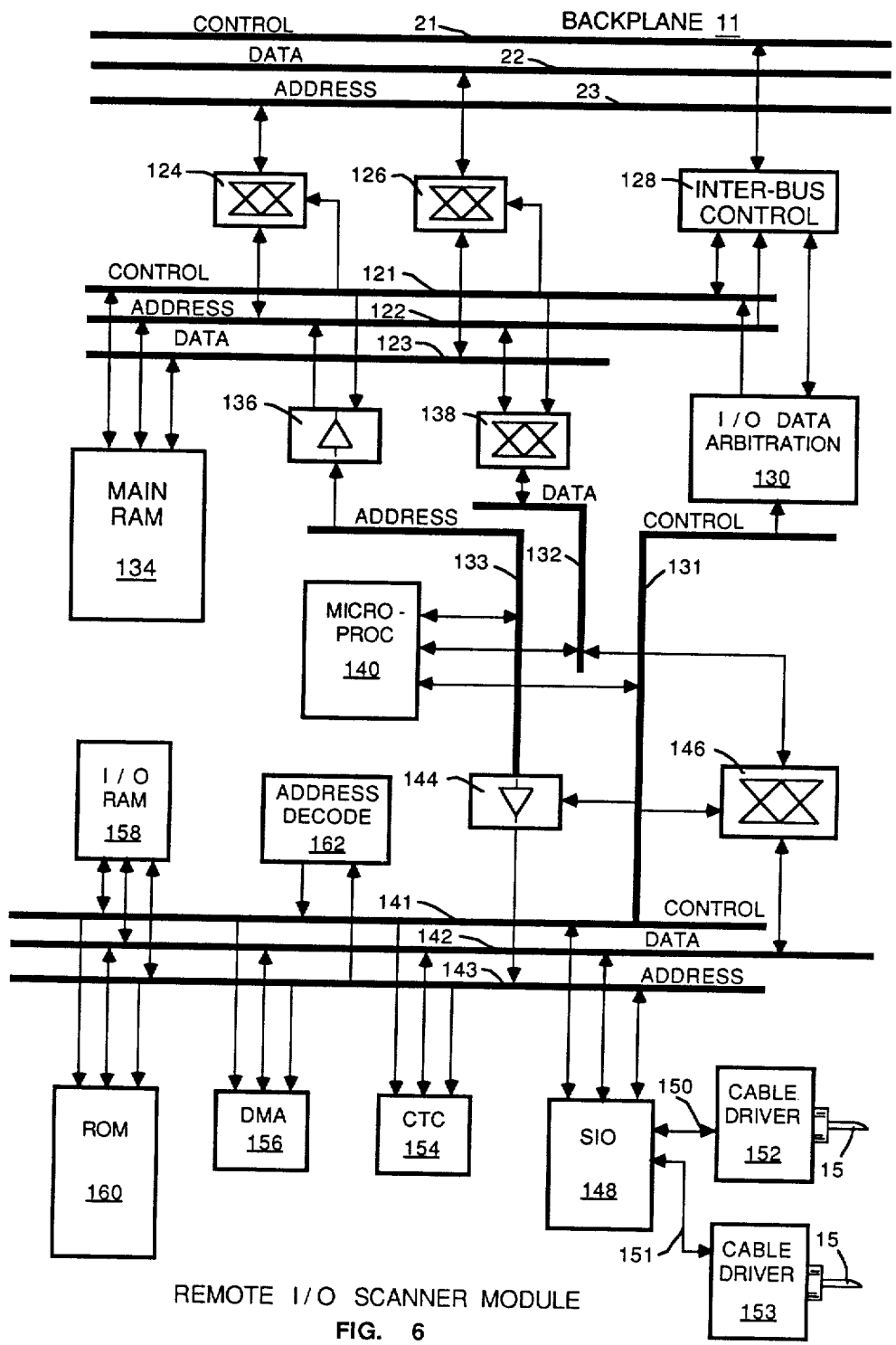
FIG. 6 is a schematic block diagram of the remote input/output scanner of the FIG. 2 programmable controller.

As noted above, the I/O scanner modules gather input sensor data for use by the program execution processor modules 18. Referring to FIG. 1, 2 and 6, a remote I/O scanner module 20 couples the programmable controller 10 to one or more remote input/output racks 17 containing individual I/O modules 19 which interface the sensors, or input devices, and actuators, or output devices, to the programmable controller 10. Each scanner module 20 periodically requests input data pertaining to the status of the input devices connected to the remote I/O racks 17 and stores it in the module's input image table for reading by other controller modules, such as the processor modules 18. The scanner module 20 also contains an image table of output data that it receives from other controller modules, such as the processor modules 18. At regular intervals the updated output data in the scanner module's output image table is transferred to the respective remote input/output racks 17 to control the various actuators connected to these racks.

Referring specifically to FIG. 6, each remote I/O scanner module 20 connects to the three backplane buses 21-23. The I/O scanner 20 contains three sets of internal buses: memory access buses 121-123, microprocessor buses 131-133 and I/O buses 141-143. The three memory buses 121-123 are connected to the backplane 11 by a set of address bus gates 124 and a set of data bus gates 126. Both of these transmission gates are controlled by an inter-bus control circuit 128 which sends signals to the gates 124 and 126 via the memory control bus 121. A local random access memory, referred to as main RAM 134, is coupled to the three memory buses 121-123. It stores the input image table for the sensor information being input to the I/O scanner 20 from the remote I/O racks 17 and it also stores the output image table for the output data being output to the remote I/O racks 17.

Figure 8:
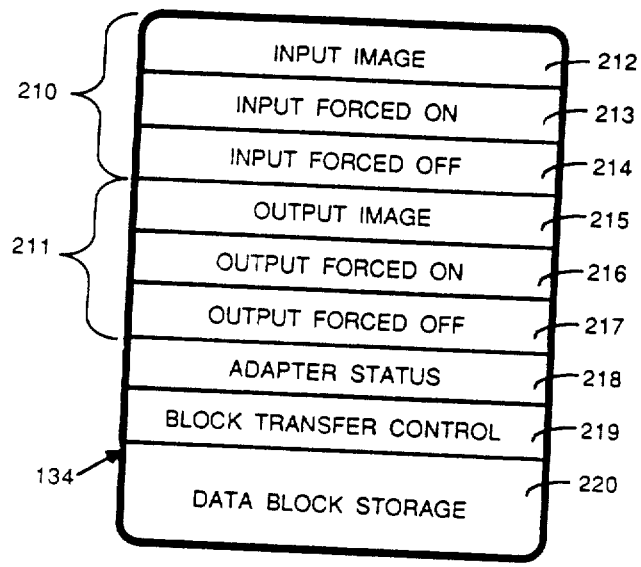
FIG. 8 is a diagram of the I/O Scanner memory data structure.

FIG. 8 shows in detail the data structures stored in the main RAM 134 of each I/O scanner module 20. These data structures include an I/O image table for the remote sensors and actuators serviced by that module 20. The input image table 210 represents the sensor data and consists of three image of the actual state of the various sensing devices. The information relating to the inputs that are forced on is contained in the second section 213 within the input image table 210. As with previous programmable controllers, the user may force the status of a given sensor to appear to be either on or off regardless of its actual state. This enables the bypassing of faulty sensors, for example. Forced on sensors are designated by a binary one in an address for each such input.

The sensors that are forced off are indicated in the third section 214 of the input image table 210 by a logical zero stored for those sensors. Although by definition the user may write into the forced data tables 213 and 214, the user is prohibited from writing into the actual input image table 212. During the operation of the programmable controller, the user programs can read either the actual input image data from section 212 or the forced image of the sensor. If the forced image is read, the scanner module 20 logically OR's the actual sensor input state with the forced on data from section 213, then that result is ANDed with the forced off data for that sensor from section 214.

The output image table 211, also stored in the main RAM 134, includes the output image data table 215 which represents the status for the output devices connected to the remote I/O racks 17 serviced by the I/O scanner module 20. Typically, this output data is determined by the execution of the user control program in the processor module 18. A second section 216 representing the forced on output data and a third section 217 representing the forced off output data are also included in the output table 211. This allows the user to define a given actuator as always being on or off regardless of the results from the execution of the user control program. For example, this is useful where a portion of the controlled equipment may have to be shut down for maintenance and should not be turned on by the user control program. The control program may read each of the output tables 215-217 individually. If the forcing of the output states is disabled the data sent to the remote I/O racks 17 for activating or deactivating the various controlled devices is obtained from the output image table 215. If output state forcing is enabled then the data sent to the remote I/O racks 17 is a logical combination of the three output tables 215-217 using Boolean logic that is identical to the combination of the three input tables 212-214 described above.

Referring still to FIG. 8, the data structure in the main RAM 134 of the I/O scanner module 20 also includes a block 218 that contains data regarding the status of the communication adapter in each of the remote I/O racks 17 serviced by the module 20. This data is used during the transfer of information over the I/O links 15 with those remote I/O racks.

Although the state of most of the sensor and operating devices may be represented by a single binary bit, certain devices, such as position sensors and analog devices, produce or require information that comprises a plurality of digital words. These data may be transmitted to or from the remote I/O rack 17 into the I/O scanner module 20 as a large block of data. Memory section 219 in the main RAM 134 contains information necessary to control such transfers of blocks of data and a companion section 220 provides a memory area for the storage of the actual blocks of data. For a detailed descriptor of this block transfer reference is made to U.S. Pat. No. 4,413,319 entitled "Programmable Controller for Executing Block Transfer with Remote I/O Interface Racks".

Referring again to FIG. 6, the inter-bus control circuit 128 also sends control signals to an I/O data arbitration circuit 130 which resolves conflicting requests for access to the memory buses 121-123 from the backplane 11 and the microprocessor buses 131-133. Two sets of transmission gates, address gates 136 and bi-directional data gates 138, interconnect the memory buses 121-123 to the microprocessor buses 131-133 and receive control signals from the I/O data arbitration circuit 130 via the memory control bus 121. The operation of the remote I/O scanner 20 is controlled by an eight-bit microprocessor 140 which is connected to three microprocessor buses 131-133. Microprocessor 140 is commercially available from Zilog, Inc. as the Z80 and it is the only device which is directly connected to the microprocessor buses 131-133, other than the sets of transmission gates 136, 138, 144 and 146 and the I/O data arbitration circuit 130.

A set of address gates 144 interconnects the microprocessor address bus 133 to the I/O address bus 143 and a set of bi-directional gates 146 interconnect the data buses 132 and 142. Both sets of tri-state gates 144 and 146 receive control signals from the I/O data arbitration circuit 130 via the microprocessor control bus 131. The microprocessor control bus 131 is directly coupled to the I/O control bus 141.

The I/O control buses 141-143 interconnect the devices which interface the I/O scanner module 20 to the remote I/O racks 17. These include a serial I/O interface circuit 148 which provides two synchronous serial input/output channels 150 and 151, each of which has its own cable driver/receiver circuit 152 and 153 respectively. A counter/timer circuit (CTC) 154 and a direct memory access (DMA) controller 156 are also connected to the I/O buses 141-143. The I/O bus section of the scanner 20 also includes a random access memory, indicated as I/O RAM 158 for temporary storage of input and output data communicated over I/O serial links 15. A read-only memory (ROM) 160 is also connected to the I/O buses 141-143 and it contains the programs which are executed by the microprocessor 140 to carry out the functions of the scanner module 20. An address decode circuit 162 is also connected to the address and control buses in the I/O section of the scanner module 20 to interpret the addresses generated by the microprocessor 140 and produce the proper enabling and control signals on the lines of control buses 131 and 141.

The operation of the remote I/O scanner modules 20 is described in a subsequent section on data acquisition and transfer.

Controller Operation

The novel architecture of the present programmable controller 10 dictates that it functions in a unique manner. The areas in which the present system operates differently than previous programmable controllers include system initialization, I/O data acquisition and transfer, and intermodule communication. However, the most significant difference with respect to this controller lies in the formulation and execution of the user control programs. Each of these unique functions will be described in detail.

System Initialization

Figure 13:
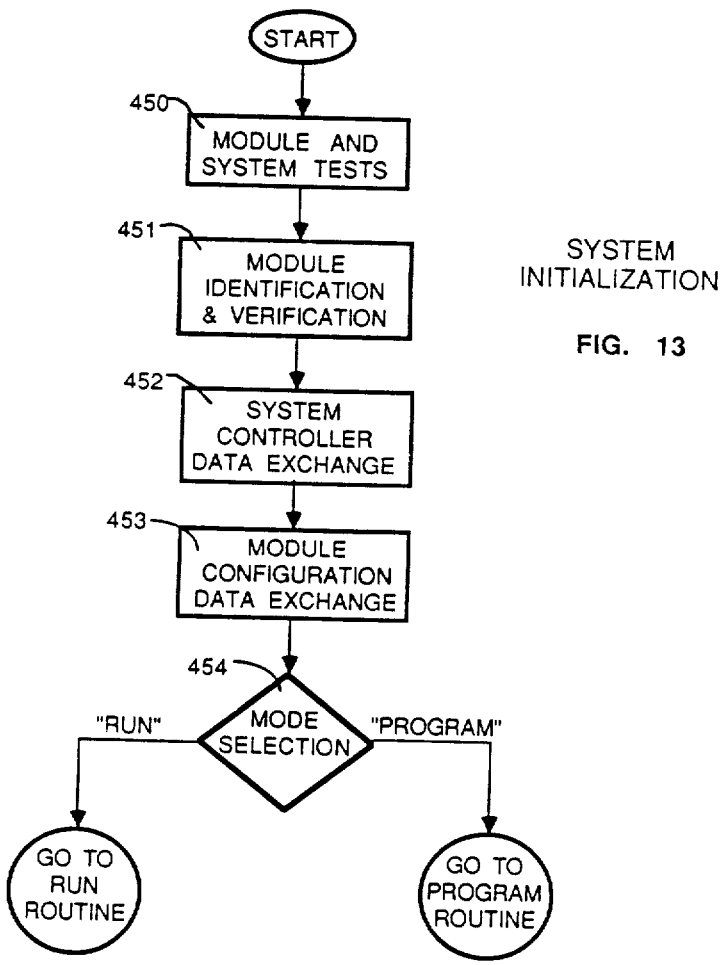
FIG. 13 is a flow chart of the programmable controller initialization routine.

During system power-up, the system controller 16 supervises the configuration of the system and various other tasks as shown in the flowchart of FIG. 13. The first phase 450 of power-up occurs immediately after the system reset signal terminates. During this interval no module is allowed on the backplane 11 and the various modules perform local tests of their own memory and other subsystems. When each module is finished, it releases a common ready line of the backplane control bus 21. When the last module has completed its internal tests the signal on the ready line is true. This signals the system controller 16 to make a transition into the next power-up phase.

During the second phase 451, the system controller 16 goes on to the backplane 11 and requests the module in each slot of the rack 12 to identify itself and provide the system controller 16 with various information regarding the module, such as the module type, and addresses for various interrupts and data pointers which are stored in the system memory 69. Based on the information received from each module, the system controller 16 verifies that the system is properly configured. For example, if there is more than one program execution processor module 18 on the system, the system controller 16 verifies that each one has a unique module thumb wheel designation and that two of them do not have the same designation.

In the next phase 452, the system controller module 16 stores the backplane communication parameters in preassigned memory locations in each module. These parameters instruct the modules how to communicate over the backplane. Once a module knows how to communicate via the backplane 11 it loads its memory address pointers into memory locations in the system memory 69 of the system controller 16. These address pointers are used by other modules to access the data in the module or issue instruction to it. For example each module loads the addresses of its interrupts into the system status section 201 of the System Memory (FIG. 7). In the course of this phase, the various functional modules may communicate only with the system controller 16, not with any other type of module. Referring again to FIG. 13, the next phase 453 of the initialization allows the modules to talk with each other and exchange any necessary data. At the completion of this phase, the programmable controller 10 at step 454 makes a normal transition into the user defined start-up mode, typically either "program" or "run."

The system has three primary modes of operation: programming, program run and fault mode, as determined by the system controller module 16. Each of these modes is subdivided into a number of internal modes. For example, the run mode has an initial input prescan internal mode which prior to program execution causes each of the remote I/O scanner modules 20 to gather data from their respective I/O racks 17 and create an initial input image table 210. Following the input prescan, a program prescan is carried out during which one or more of the user control programs are scanned once to create an initial output image table 211. Once both of these prescan modes have been completed and the input and output image tables 210 and 211 have been created, the various outputs are enabled and the run mode commences formal execution of the user control program.

In order to explain the formulation and execution of the user control program, one must understand how data and commands are transferred within the programmable controller 10.

Data Acquisition and Transfer

Referring to FIGS. 1, 2 and 6, periodically each I/O module 20 gathers input data from sensors connected to each of the controller's remote racks 17. This acquisition of data is similar to the I/O scans performed by previous programmable controllers such as the one described in U.S. Pat. No. 4,442,504. While the system is in the run mode, each I/O scanner module 20 sequentially requests each remote rack 17 to send input data regarding the status of sensing devices connected to the remote rack.

With reference to FIG. 6, the gathering of data from the remote I/O racks 17 is carried out by microprocessor 140 instructing the I/O data arbitration circuit 130 to enable transmission gates 144 and 146. This couples the microprocessor buses 131-133 to the I/O buses 141-143. After the connection of the buses is completed, the microprocessor 140 sequentially sends commands to the remote I/O racks via SIO 148 and line drivers 152 and 153. In response to these commands the remote racks 17 transmit their sensor input data to the I/O scanner module 20. The received input data is temporarily stored in I/O RAM 158. The communication protocol used to gather data from the remote I/O racks 17 is similar to that used by previous programmable controllers.

At regular intervals the gathered input data is transferred from the I/O RAM 158 to the input image table contained within the main RAM 134. This transfer is accomplished by the microprocessor 140 requesting that the I/O data arbitration circuit 130 couple the memory access buses 121-123, microprocessor buses 131-133 and I/O buses 141-143 together. If the backplane 11 is not coupled to the memory access buses 121-123, the I/O data arbitration circuit 130 will issue control signals via control buses 121 and 131 to transmission gates 136, 138, 144 and 146. In response to the control signals, the transmission gates interconnect the three sets of internal buses. The I/O data arbitration circuit 130 then sends an acknowledge signal to the microprocessor 140 indicating that the connection has been made. Upon receiving the acknowledge signal, the microprocessor 140 transfers the data between the I/O RAM 158 and the main RAM 134. The input data is stored in the input image table 212 (FIG. 8) of main RAM 134. When the transfer is complete the microprocessor 140 signals the I/O data arbitration circuit 130 to disconnect the interconnection of the internal buses.

At other periodic intervals, the remote I/O scanner module 20 sends output state data to the remote I/O racks 17. This process is similar to that described immediately above with respect to the input status data. The microprocessor 140 requests the interconnection of the internal module buses 121-123, 131-133 and 141-143. Once the interconnection is made the output image table data in main RAM 134 is transferred to the I/O RAM 158. The bus interconnection is then disconnected. The output data in I/O RAM 158 is systematically sent to the remote I/O racks 17 over serial links 15 to activate or deactivate the operating devices on the controlled equipment.

As noted above, the I/O RAM 158 is used to store the data that is sent and received over the serial links 15. During the communication process the microprocessor 140 does not have to access the main I/O image table stored in main RAM 134. This freeing of the main RAM 134 from communication tasks as well as the I/O module's separate internal bus configuration permits other modules on the backplane 11, such as the system controller 16 and processor modules 18, to directly access the I/O image table data in the main RAM 134. This direct access from the backplane does not involve the microprocessor 140 which may be simultaneously controlling the communication with the remote I/O racks 17.

When the system controller 16 or one of the processor modules 18 desires to read the status of a given input device, it requests access to the backplane buses 21-23 in order to interrogate the I/O scanner module 20 that receives the input data from that particular sensor. Upon being granted access to the backplane 11, the processor module 18 or system controller 16 addresses the appropriate I/O scanner module 20. In response to this addressing, the interbus access controller 128 within the respective I/O scanner module 20 receives an access request signal over a line of the control bus 21 of the backplane 11. The interbus access controller then signals the I/O data arbitration circuit 130 that a request to access main RAM 134 has been received from another module. At the appropriate time when the internal memory buses 121-123 are available to be connected to the backplane buses 21-23, the I/O data arbitration circuit 130 signals the interbus access controller 128 that it may connect the backplane and memory buses together via transmission gates 124 and 126. The completion of this connection is then acknowledged by the inter-bus control circuit 128 to the requesting module via a line of the backplane control bus 21. The other module then reads from or writes data into the I/O data image table in the main RAM 134. The data transmission may be a single data word or a block of words. The requesting module holds control of the backplane 11 until all of the requested data has been transmitted to it from the I/O scanner 20. When the access is finished the inter-bus control circuit 128 is signaled via the backplane control bus 21 and the connection to the backplane 11 is disconnected.

As is seen, the configuration of the I/O scanner module 20 permits other modules connected to the backplane to have direct access to the I/O scanner's main RAM 134 without the intervention of the scanner's microprocessor 140. This allows the microprocessor to devote its attention to controlling the gathering of sensor data and transmitting output commands to the equipment actuators.

The access to the I/O image table data by each program execution processor 18 may be on an "as needed" basis or periodically an image of the entire I/O data table may be read by the processors from the scanner modules 20. In the "as needed" mode whenever the user controller program being executed by the processor module 18 requires the evaluation of a sensor status, the processor module 18 gains access to the backplane buses 21-23 and requests data from that sensor via the appropriate I/O scanner 20. This mode is referred to as "asynchronous" in that the access to the I/O scanner module 20 is on an "as needed" basis and not a periodic basis which is synchronized to the execution of the user program.

An alternative method of accessing the sensor input data from the I/O scanner modules 20 is in a synchronous, or periodic, fashion. At a given point within the execution of the user control program by the program execution processor 18, the input image table 210 from each I/O scanner 20 is read and copied into the local memory 106 within the processor module 18. For example, just prior to the commencement of each pass through the user control program, the processor module 18 gains access to the backplane 11 and interrogates each of the I/O scanner modules 20 copying each scanner's input image table 210 into the processor module memory 106. This ensures that the input data being used during the subsequent pass through the user program will remain constant and that each rung will be evaluated using the same sensor status. The choice of which mode of operation to use is left to the operator/programmer and depends upon the characteristics of the particular function chart and user control programs being executed.

Referring particularly to FIGS. 2 and 8, the output image table 211 in each I/O scanner module 20 is updated immediately upon a change of the status of an actuator connected to one of the remote I/O racks for that module. Specifically, when the user's program calls for a change in status of a controlled actuator, the program execution processor 18 gains access to the I/O scanner module 20, as described above, and reads from the I/O scanner RAM 134 the output image table word that contains the bit or bits to be changed. Once the processor module 18 receives a copy of that output image table word, it changes the corresponding portion and writes the altered word back into the output image table 211 of the same scanner module 20. During this reading and writing of the I/O scanner module's RAM 134, the program execution processor module 18 retains control of the backplane buses 21-23 so that no other module may read or alter the output image table 211 of that scanner module 20 while the processor module 18 is performing its output function. This ensures that the output image table 211 is not changed or that another execution module uses stale data. It is, however, up to the user, through the control programs, to ensure that a given controlled device is only being activated or deactivated by one processor module 18 at a time.

Once a module has relinquished its control of the backplane 11 another module in the system may access the backplane. If more than one module seeks such access at the same time, the backplane arbitration circuit 84 in the system controller 16 resolves the conflict. The arbitration circuit 84 implements the rotating priority scheme described above whereby the highest priority level for backplane access passes from one module to the next in rack slot number order. Initially, the module in the leftmost rack slot has the highest priority and the priority level decreases with each slot to the right. At this time, if a conflict exists between the modules in the second, fourth and sixth slots, the module in the second slot gains access. When a module is granted access, the priority levels shift one module slot to the right. Now the second module has the highest priority and the module in the first slot has the lowest priority. Then, if the modules in the first, third and eighth slots simultaneously seek access to the backplane 11, the third module gets access as it has the highest priority among the three. Then the eighth module has access and finally the first module is granted access the backplane 11. The priority keeps shifting whenever any one of the modules accesses the backplane 11. After the module in the last slot has had the highest priority level, the highest level rotates back to the module in the first, or leftmost, slot.

The system controller memory 69 may also be directly addressed by other modules on the backplane 11 so that they may gain access to system data. During the execution of the user control program, the main functions performed by the system controller 16 relate to the handling and execution of communications on the local area network 28 and the programming terminal 24.

A module requiring data from the system controller module 16 or an I/O scanner module 20 is able to access the main RAM's in these modules directly via the backplane 11. However, when a module desires to send a block of data or a command to another module in the rack 12, a different technique for communication between the two modules must be employed.

Inter-module Communication

As indicated above, I/O data may be transferred directly from one module on the backplane 11 to another module. This direct transfer is possible when data is being read from or written to very specific memory data structures, such as an I/O image table, in the other module. However, in the present multiprocessor system, other forms of messages, which do not reside in predefined data structures, are often conveyed between the modules. A more general purpose intermodule communication protocol is required for such messages. This process is referred to herein as sending "mail".

Figure 14:
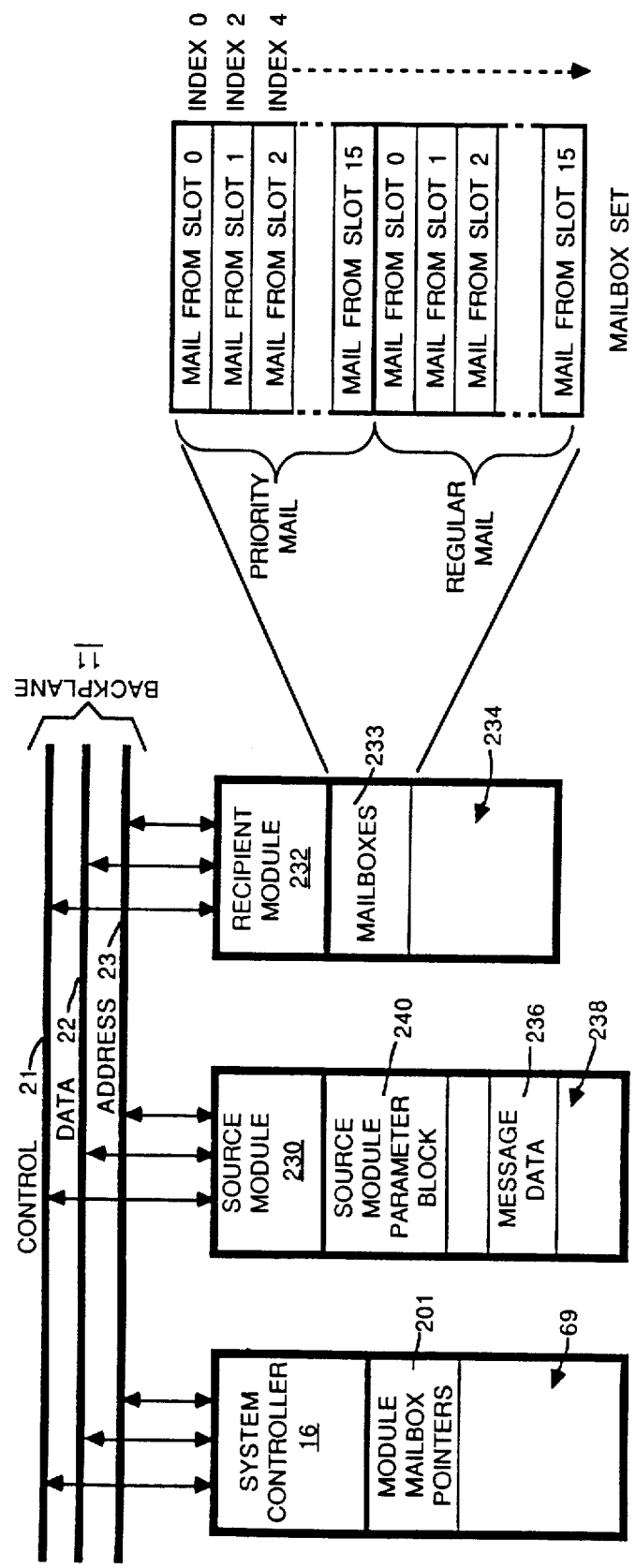
FIG. 14 is a schematic representation of a portion of the system of FIG. 1 used to described the communication of messages between modules of the programmable controller.

Within each module that is capable of receiving mail is a set of mailboxes illustrated in FIG. 14. The set comprises sections for two priority levels of mail designated herein as "priority" and "regular" mail. If necessary additional priority levels for messages can be provided by defining additional mailbox sections. Each section has sixteen mailboxes, each consisting of a two word storage location. These sixteen mailboxes allow the exchange of messages with modules in the eight slots of the main programmable controller rack 12 and with eight modules in an auxiliary rack (not shown). Each of the mailboxes in each section corresponds to one of the slots in the two racks. During the configuration process, each module writes the address of the top of its mailbox set into the area of the system status file 201 (FIG. 7) which contains data for that module. The address of each module s mail interrupt is also stored in the system status portion 201 of the main system memory 69.

Figure 12A:
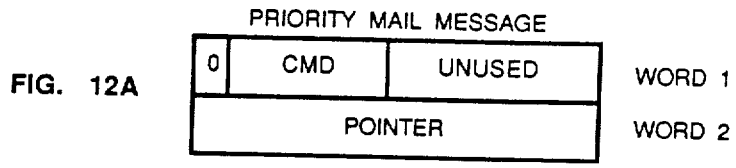
FIGS. 12 A and B show the entries in the mailboxes of FIG. 14 for different types of messages.

A "priority mail" message forms an urgent command which the recipient module is to immediately carry out. The command is either executed within the mail handling task which detects the receipt of the command, or it is passed to a destination task for processing. The priority mail message consists of two sixteen bit words as shown in FIG. 12A. The first bit of the first word is a zero designating the message as priority mail. The next seven bit field (CMD) of the first word contains the coded form of the command to be executed which is selected from the following list:

| Command Code | Command Description |
|---|---|
| 1H | Mailbox Command Acknowledgment |
| 2H | Begin Function Chart Step Execution |
| 3H | Begin Interrupt Routine Execution |
| 4H | Change System Mode |
| 5H | Change Power Up Phase |
| 6H | End Power Up |
| 7H | Halt Active System Operation |

The remaining bits of the first word are not be used by every command. The second word contains a pointer to a location within the recipient module local memory containing data for executing the command. For example, a priority mail message is sent by one program execution processor module 18 to inform another such module to commence the execution of a specific user program for a given function chart step. In this instance the command (CMD) in the first word is "2H" telling the recipient module to begin a new function chart step. The second word is an offset pointer for the table containing the address in the recipient's memory that contains information about the step and its control program. This information is passed to the function chart interpreter program in the recipient module.

Figure 15:
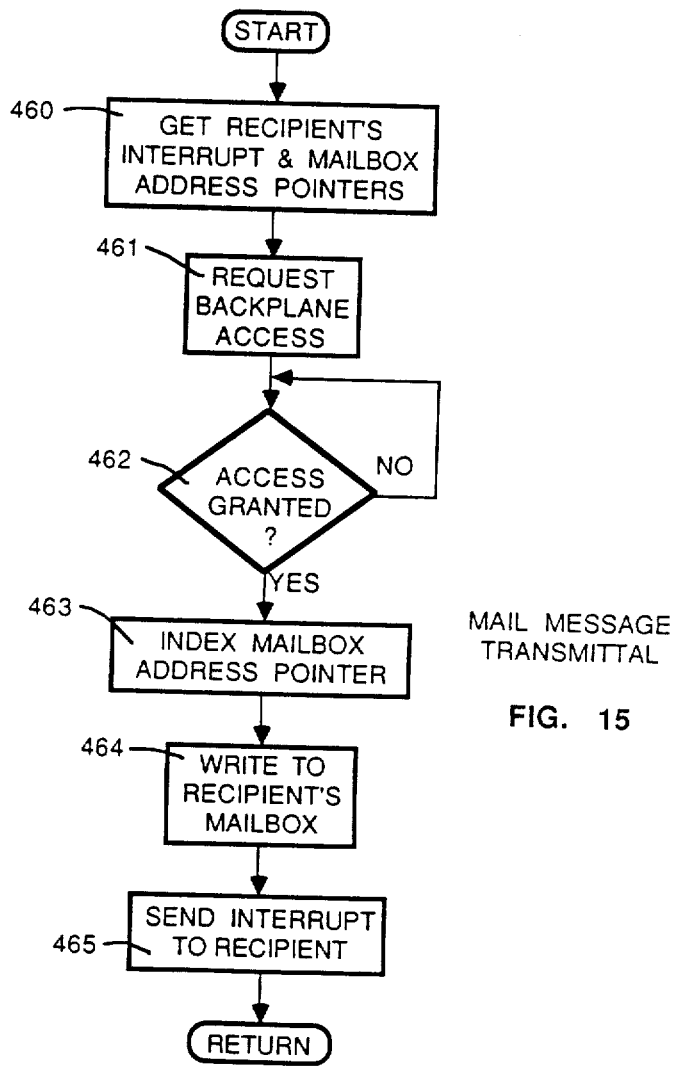
FIG. 15 depicts a flow chart of the program steps to initiate the sending of a message from one module to another in the programmable controller.

Referring to FIGS. 12A and 14, in order to send mail the source module 230 first formulates the two word message in its memory. The transfer of the message is controlled by the mail handling task within the module, see FIG. 15. The priority mail transfer process is initiated by the source module 230 accessing the system controller main RAM 69 via the backplane 11 to obtain the addresses of the mail interrupt and the top of the mailbox set 233 in the recipient module 232 at step 460. These addresses are stored in the system status section 201 of the system controller's main RAM 69 (FIG. 7). The source module 230 knows the index from the top of the mailbox set 233 in order to access its mailbox slot in the recipient module. The mail handling task in the source module 230 then again seeks access to the backplane 11 at step 461. When it receives access to the backplane 11 at step 462, the source module 230 checks the first word of its priority mailbox in the recipient module memory 234 at step 463. If the first word of the mailbox is non-zero indicating a previous message is still in the mailbox, the source module waits a period of time and tries again. When the first mailbox word is found to contain all zeroes, the source module 230 writes the two word message containing the command and address offset pointer into its slot in the recipient mailbox list at step 464 and sends an interrupt word to the recipient module's mailbox interrupt address at step 465.

The mail handling task in the recipient module 232 in response to the interrupt reads the priority mail entry. If the entry is a command to start a new function chart step, an entry is made in the queue for the function chart interpreter program. An acknowledgment is then returned to the source module 230 via an entry in its mailbox set and an interrupt. At this time the recipient module loads the source module's mailbox slot with zeroes preparing it to receive another message.

"Regular mail" typically is used for transferring more than two words of data, although command messages described above also may be sent to these mailbox slots. For example, regular mail is used during system start-up to send configuration data to each module. It is also used during normal operations to send messages that do not require immediate response or action. Still referring to FIG. 14, when a source module 230 has several words of data to transfer, it assembles the data into a block 236 in its local memory 238. It then stores, in another block of memory 240, all the parameters necessary for the destination module to access the data in the source module's memory and acknowledge access to the source module 230. These parameters have a predefined format similar to that used in previous programmable controllers, such as disclosed in U.S. Pat. No. 4,442,504. The parameters include the address of the data message, its length, the destination module's task which will use the data, and other information necessary to transfer the data.

Figure 12B:
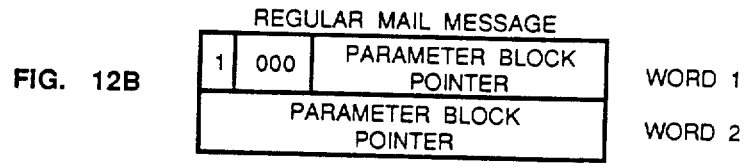

The two word message then is formulated in the source module's memory 238. The format of the message shown in FIG. 12B. The first bit of the first word is a binary one designating this as a regular mail message. The next three bits are all zeroes indicating a data block type message as opposed to a command. The remaining twelve bits of the first word and all sixteen bits of the second word contain the beginning address of the transfer parameters within the source module.

The source module 232 then notifies its mail handling task to send the regular mail message. As with priority mail, this mail entry accesses the backplane 11 and tests its regular mailbox slot in the recipient module's memory to make sure that it is empty. When the first word of the mailbox slot in the destination module is all zeroes, the two word regular message are written into the slot. Once the mailbox slot in the recipient module is loaded, the interrupt word is sent to the recipient module's mail interrupt address.

The recipient module 232 upon being interrupted scans its mailboxes for the message. Unlike priority mail, the recipient module 232 does not immediately process the regular mail, but places the mail entry in a queue for handling when time permits. The handling of regular mail is a lower priority task as compared to the execution of the user control program. When the recipient module 232 has time available, it accesses the source module's memory 238 via the backplane 11 and reads the information in the parameter block 240. The recipient module then uses these parameters to copy the message data block 236 into its local memory 234 via the data acquisition process described above. After copying the data the recipient module 232 sends an acknowledgment via regular mail to the source module 230 and zeroes out the regular mailbox slot. The data then may be processed by the recipient module 232.

With an understanding as to how data and commands are sent between modules, the execution of the different types of programs can be described.

Program Formulation and Execution

The present programmable controller may execute several general types of programs, such as a machine operation program, independent background programs, interrupt subroutines and fault subroutines. The machine operation program is developed by the user of the programmable controller to apply it to his particular machine or process. For very complex processes, the machine operation program is defined by a sequential function chart showing each major step of the process. A separate user control program is developed to perform the functions of each step. These user control programs may comprise ladder diagram programs, as well as control programs written in higher level languages. Because the preferred embodiment executes compiled versions of the user control programs, assembly language and high level languages, such as BASIC, may be employed to generate the source code for the user control program. The independent background tasks are user programs that are subordinate in execution to control programs and may be used for lengthy non-time critical operations such as data transfer and report generation. Interrupt routines allow high priority operations to be executed upon the occurrence of a given event, while fault routines permit a graceful recovery from a detected error condition in either the programmable controller 10 or the equipment being controlled.

Each processor module 18 has its own operating system which runs completely independent of the other modules 18 in the system and which is unaffected by the processing of those other modules. Routines on the same processor module 18 share the resources of that module with the operating system deciding how much processing time is allocated to each one of the simultaneously running routines.

In order to provide orderly execution of the various types of programs by a processor module, a priority system is established. The highest priority level consists of various interrupt routines that are so time critical that their execution may never be interrupted. The next level includes all other interrupts which are normally run to completion except when a top priority interrupt or fault occurs.

Interrupt routines comprise processor input interrupts and selectable timed interrupts. Processor input interrupts are started by an externally generated input and are used for high priority routines which are intended to be executed only upon the occurrence of a specific input condition. To accommodate the processor input interrupts, each processor module 18 has an interrupt interface 99 (FIG. 4) which receives and handles interrupt signals from external devices. The selectable timed interrupt routines are started at regular specified intervals by the system's real time clock. A priority is associated with each interrupt and if more than one interrupt is pending, the one with the higher priority will be executed first.

The execution of the various other program types is carried out by grouping the programs and allocating a portion of the processing time to each group. A given amount of the execution time may be designated by the operator during system configuration for the execution of non-time critical operations; such as background tasks, handling of inter-module messages, communicating with other computers and miscellaneous tasks. These low priority operations will be collectively referred to as "background tasks," although it is understood that background tasks are but one type of these operations. Typically, the operator may select 20, 30, 40 or 50 percent of the processing time of each processor module 18 for handling these tasks. The operating system will time-slice between the various operations of this type during the time allocated for them. When the allocated time expires the processing of these tasks is suspended until the occurrence of another interval for their operation. In addition, if the processor module is not currently executing a control program, the entire processing time will be devoted to the background tasks as necessary.

The remaining processing time is allotted to the execution of the machine operation program. As this task is usually time critical, the amount of time designated for background task processing generally is a function of how much time must remain for the machine operation program. The machine operation program continues running until a timed interrupt signals the start of a background task interval.

The present programmable controller provides an improved system for executing the machine operation control programs, therefore, these programs will be described in detail. A function chart program defines the overall control process as a sequence of steps. As per convention each step is followed by a transition condition which specifies when the step is completed. A separate user control program, such as a ladder program, is written for each step and transition of the function chart.

The machine operation programs are written on terminal 24 or on a personal computer or host computer connected via the local area network 28. These programming devices contain the necessary software so that the programmer can author the function chart and the user control programs. The computer also compiles each user control program into machine language instructions for direct execution by one of the processor modules 18. If a ladder program is used as the user defined control program, the technique for authoring it is the same as for conventional programmable controllers. The only difference is the compilation of the completed program.

The authoring of the function chart is different for the present programmable controller than for previous ones. The function chart is still graphically constructed on the screen of the programming terminal 24 and the software and techniques for doing this are similar to that practiced with conventional programmable controllers. However, unlike previous controllers, the function chart does not produce executable code but rather generates a set of descriptor files which may be thought of as directives that instruct the programmable controller which user control program to execute, when to do so and which processor module to use.

Figure 10:
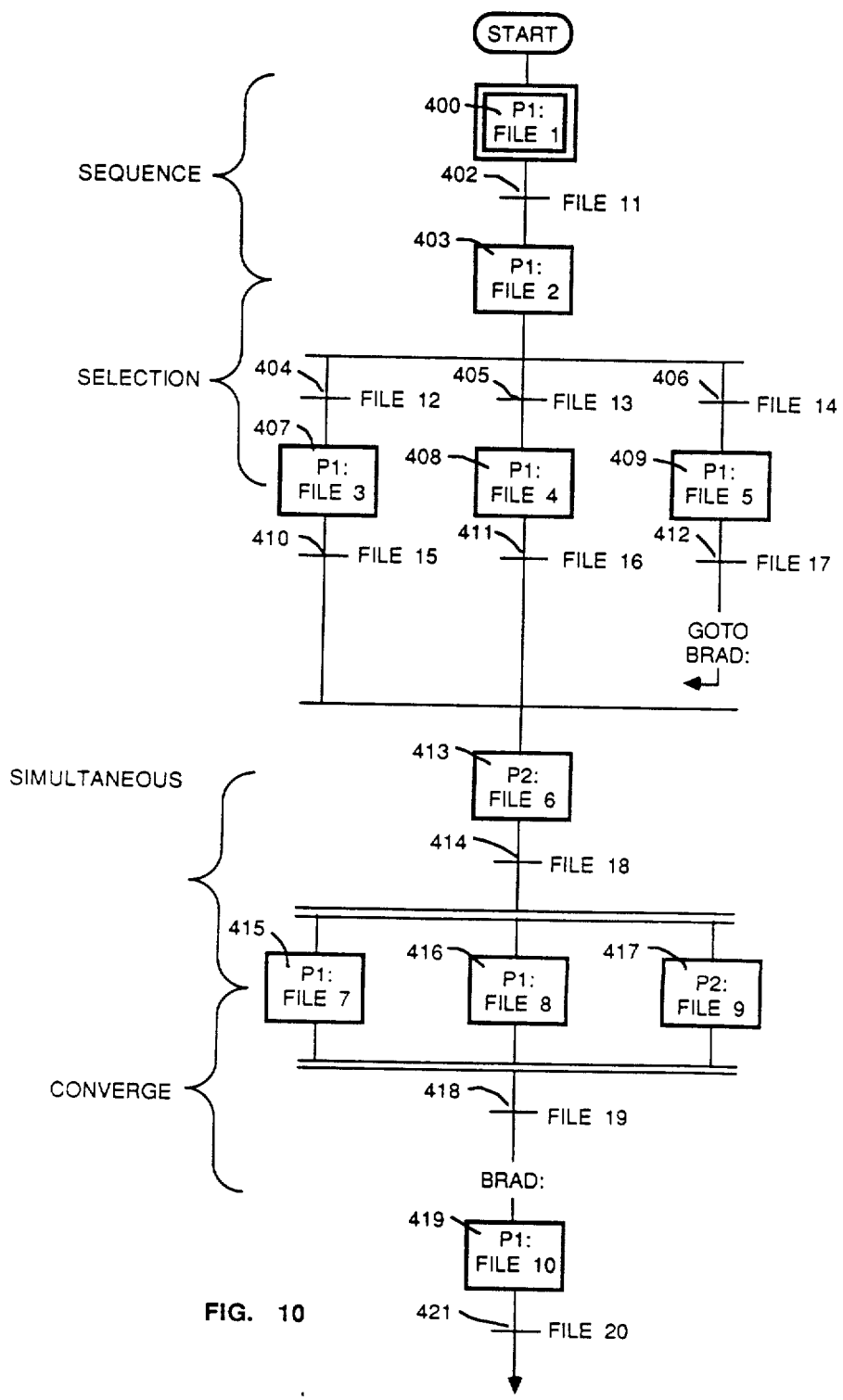
FIG. 10 is an exemplary function chart diagram.

An example of a function chart is shown in FIG. 10. Each processing step of the function chart is designated by a rectangle, such as box 403, and each transition from one step to another is designated by a horizontal line, such as line 402. The initial step of the function chart is defined by a double box as illustrated by box 400. As with function charts for previous programmable controllers, step 400 includes the name of a file in memory (e.g. FILE 1) that contains the user control program to be executed for that step. Unlike previous function charts, the box 400 also contains an indication (P1, P2, etc.) of the processor module 18, that will execute the user control program for that particular function chart step. The present programmable controller 10 has two processor modules 18 which are designated P1 and P2, although additional processor modules can be inserted in the rack 12. The control program for step 400 for example is executed by the first processor module P1 which repeatedly executes the program until a programmed condition is met. That condition is represented by a transition (such as at 402) immediately below the box (400) in the function chart. Typically the transition 402 is defined by a single rung ladder program, which is executed on the same processor module (e.g. P1) as the associated step. If this rung is found to be true, the execution of the ladder program for step 400 ceases and the program execution advances to the next function chart step 403. The portion of the function chart in FIG. 10 containing step 400, transition 402 and step 403 is typically referred to as a "sequence" construct in that each step sequentially follows the other.

Following step 403 are three separate program branches, only one of which will be selected for execution depending upon the corresponding transition condition. This choice of one of many branches is referred to as a "selection" construct. The first branch includes an initial transition 404 that is defined by the user control program contained in file 12 and processing step 407 defined by the user control program contained in file 3. Step 407 is followed by a termination transition condition 410 that is contained in file 15. Similarly, the middle branch contains an initial transition 405, a processing step 408 followed by a termination transition 411. The third and final branch of the selection construct consists of initial transition 406, main processing step 409 and a termination transition 412. A GOTO statement follows transition 412 indicating that the program execution is to jump to the point in the program where the specified label (e.g. Brad) appears. In this case the program is to jump to function chart step 419. It should be noted that since only one of the three branches of the selection construct is executed, they all may be processed by a single processor module 18, in this case the first processor module P1. Although, different branches could be designated for execution by different processor modules 18.

Upon the completion of the previous function chart step 403, which preceeds a selection construct, the conditions of the initial transitions 404-406 in each branch are sequentially examined. The first initial transition which is found to be true determines which of the branches will then be executed. For example, if the condition defined by the user control program in file 13, transition 405, becomes true first then only the middle branch having step 408 will be executed. The completion of the user control program for step 408 is indicated by the termination transition 411 contained in file 16. When that transition becomes true, the program transfers to step 413 contained in file 6 which is executed on the second processor P2.

Once step 413 is completed as indicated by transition 414 the function chart enters what is referred to herein as a "simultaneous" construct. A simultaneous construct comprises a plurality of function chart branches each containing at least one step. As the name implies the branches are executed simultaneously. In this case three processor steps 415–417 are to be executed in unison. The first step 415 comprises the control program stored in file 7 which is to be executed on the first processor module P1. The program for the second branch step 416 is contained in file 8 and is to be executed on the first execution module P1, while the third branch step 417 which is represented by the control program in file 9 is assigned to the second processor module P2. Because files 7 and 8 are both assigned for execution by the first processor module P1, the user control program contained in each of the files will be concatenated (i.e. strung together to run sequentially). This concatenation is similar to that practiced in present programmable controllers. However, whereas previous programmable controllers would have to concatenate all of the simultaneous construct files, including file 9, the present system has assigned file 9 for execution by the second processor module P2 and the remaining two files 7 and 8 for execution by the first processor P1. If the programmable controller 10 contained three separate processor modules 18, the function chart step for each branch could be assigned for execution by a separate one of the modules.

As an example, the simultaneous construct portion of the function diagram in FIG. 10 could control a manufacturing process where the user control program in file 7 controls the manufacturing process by reading various sensors and in response thereto activates or deactivates various pieces of production equipment. File 8 may consist of a control program that displays on the terminal 24 the status of the process being controlled by the program in File 7. In this case, the user control program in File 9 may monitor other sensors and activate alarms should any of these sensors indicate that given manufacturing errors have occurred.

The transition out of the simultaneous construct section is indicated by what is referred to herein as a "converge" construct. This construct contains a single transition step 418 in which the program in file 19 is executed on the second processor module P2 following each scan of the user control program in file 9. When the transition 418 is true, the execution of each branch of the simultaneous construct ceases at the end of their current program scan. As noted above with respect to the data structure of the system controller 16 in FIG. 7, the system support file 203 contains a memory area for the step counters of the simultaneous portions of the function diagram. One of these counters is loaded upon entry into the simultaneous section with the number of simultaneous processing steps in the construct. After the transition condition 418 is satisfied, this counter is decremented as each step 415–417 completes its program scan and comes to a halt. When the counter reaches zero, all of the simultaneous steps are completed and the transition to the next step 419 following the converge construct can occur.

In prior art systems, the three function chart steps 415–417 (FIG. 10), which were simultaneously executed, had to be concatenated for execution by a single processor and the execution of a given user control program occurred only once per pass through all three programs. Therefore, with respect to the above example if the control program in File 9 was an alarm function, it would only be scanned at the completion of the scan of the control programs in Files 7 and 8. Whereas in the present multiple processor system which utilizes parallel processing, the ladder program for the alarm function is repeatedly processed by its own processor module P2 without the intervention of other user control programs being concatenated with it. This provides more frequent monitoring of time-critical conditions than is possible in a single processor system.

The graphical representation of the function chart per se is not executed by the programmable controller. It is used, however, by the programming terminal software to assemble a set of data files for each of the processor modules 18. Specifically, the function chart is reduced to a series of descriptor files that describe the operations of a portion of the function chart. Each descriptor contains data which identifies the user control program for a step in the function chart, data which identifies the termination transition, and data which identifies the descriptor (and its processor module) that is to execute the next section of the function chart. These descriptor files are stored in the processor module 18 designated in the function chart. The function chart interpreter software in each processor module 18 uses the respective descriptor files to control the execution of each user program.

Figure 11A:
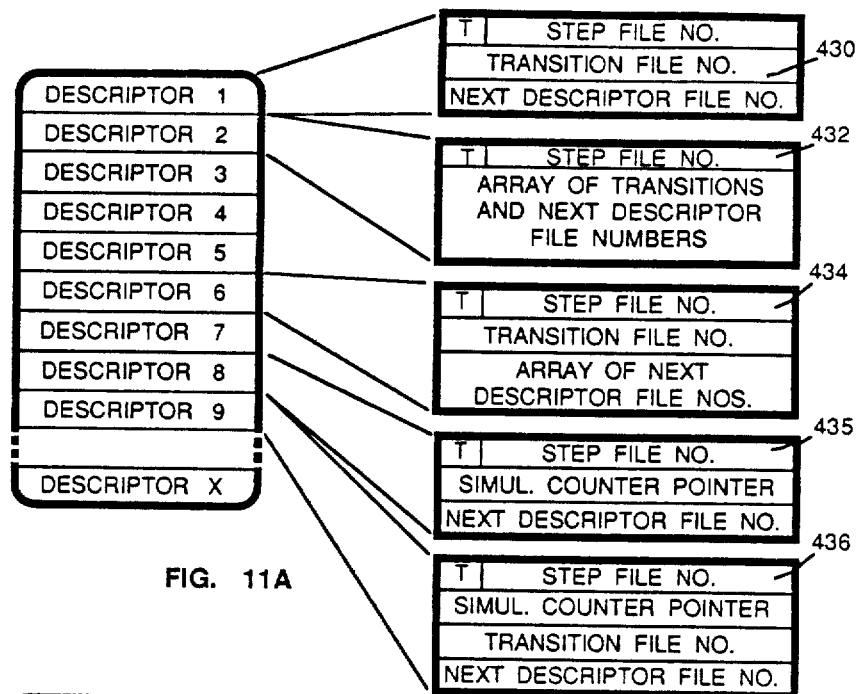
FIGS. 11 A, B and C are illustrations of the descriptor file data structures generated from the function chart program of FIG. 10.

By way of example with reference to the exemplary function chart of FIG. 10, a master descriptor file table is generated by the programming terminal 24 as shown in FIG. 11A. The descriptors fall into four distinct catagories which correspond to the function chart construct (i.e. sequence, selection, simultaneous, and converge) that generated the descriptor. Referring to FIGS. 10 and 11A the first descriptor 430 represents the sequence portion of the function chart, and its contents are displayed on the right side of FIG. 11A. The first word of the descriptor contains several bits, T, which indicate the type of the descriptor file, in this case a sequence type. The remaining portion of the first word identifies the number of the file that contains the user control program to be executed for the corresponding function chart step. In this example, function chart step 400 contains the user control program in file 1 for the first processor module P1. The first descriptor 430 also contains the number of the transition file which specifies the condition that is to occur before the execution of the user control program should terminate. File 11 is the transition file number in the first descriptor 430 as specified at point 402 in the function chart. The descriptor 430 also identifies the next descriptor file to be used upon the completion of the current descriptor file and the processor module 18 in which it is stored. In this example the first descriptor 430 designates "Descriptor 2" as the next descriptor file which is assigned for execution by the first processor module P1.

The second descriptor file 432 on FIG. 11A is generated from the selection construct of the function chart in FIG. 10. The first word in the second descriptor 432 indicates that it is a selection type and that file number 2 contains the user control program for this step. The remainder of the descriptor 2 contains an array of transitions and their corresponding next decriptor file number and processor. For example, as shown in the function chart of FIG. 10, the first element of the array indicates transition file 12 and its next descriptor is descriptor 3; the second element of the array indicates transition file 13 and next descriptor 4; and the final entry in the array indicates transition file 14 followed by the next descriptor 5.

The descriptors for the three selection branches (descriptors 3, 4, and 5) are of the sequence type and have the same format as the first descriptor 430. The sixth descriptor is designated as the next descriptor file number in both descriptors 3 and 4. However, the next descriptor file number in the descriptor 5 for the third selection branch is the tenth descriptor for step 419 because of the GOTO statement in the function chart.

The next type of descriptor is represented by the sixth descriptor 434 in FIG. 11A, which is produced from the simultaneous construct of the FIG. 10 function chart. The sixth descriptor 434 contains information regarding its type, the user control program file number and a single transition condition file to be executed. This descriptor 434 also contains an array of the next descriptor files which indicate the descriptors for each of the simultaneous construct branches, in this example branch steps 415–417. Each of these next descriptors is executed by its designated processor module 18 when the transition condition occurs.

The final type of descriptor file is a converge descriptor which controls the execution of each simultaneously executing branch, for example, steps 415–417 of the function chart in FIG. 10. A converge descriptor is generated for each branch. The branch steps 415, 416 and 417 are represented by descriptors 7, 8 and 9 in FIG. 11A. All of the converge descriptor files, as shown by descriptors 435 and 436, contain a word having several bits (T) designating its type and the number of the file containing the user defined control program for the function chart step. Each converge descriptor file also contains a pointer to the simultaneous counter address in the system support file 203 within the memory of the system controller module 16. As will become apparent in the course of the descriptor of the function chart interpreter software relating to the converge portion, the simultaneous counter is used to determine when all of the simultaneous branches have completed their execution. All of the converge branch descriptors also contain the number of the next descriptor file to be executed and the processor module containing it. The converge descriptor file for the rightmost branch, in this case the ninth converge descriptor 436, also identifies the file containing the transition condition upon the occurrence of which the simultaneous execution terminates.

Figure 11B:
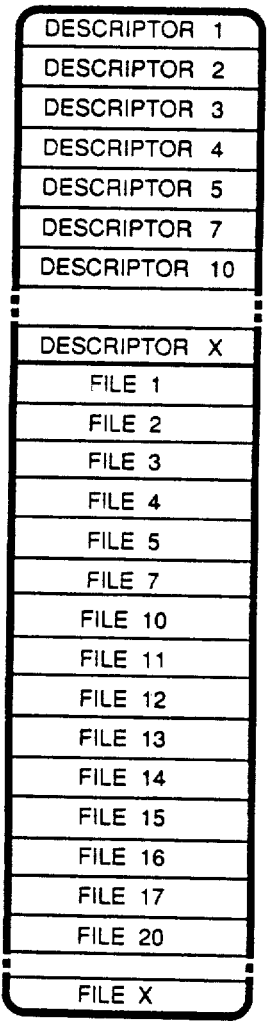
Figure 11C:
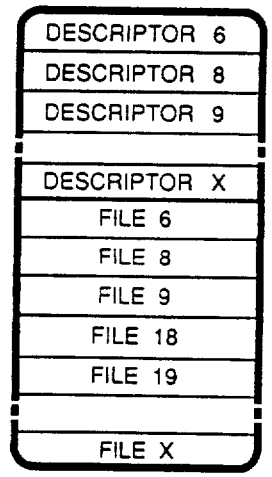

Once all of the individual descriptors are assembled by the programming terminal 24, they are sorted into groups according to the particular processor module P1 or P2 that has been assigned to interpret them. The various user control programs which are specified in the descriptors are similarly sorted by processor module. The descriptor data and user control program files are then transferred by the programming terminal 24 into the proper processor module 18 in the programmable controller 10. For example, the function chart descriptors 1–5, 7 and 10 and the user control programs in files 1–5, 7, 10–17 and 20 are assembled into a single data structure, as shown in FIG. 11B. This data structure is downloaded into the program memory area 313 of the first program execution processor module P1. The descriptors and user control program files for the remaining steps and transitions are assembled into another data structure as shown in FIG. 11C for the second processor module P2.

Once the sorted files have been downloaded into the respective processor modules 18, the programmable controller 10 is placed in the "run" mode. Each processor module 18 contains a function chart interpreter program which interprets the descriptors stored in its RAM 106 and executes the user control programs called for by the descriptors. When the execution of a machine operation step terminates, such as when the transition condition is satisfied, the interpreter program may commence interpretation of the next descriptor file or notify another processor module 18 that contains the next descriptor to begin interpreting it. As required by the descriptors, one or more processor modules can execute different portions of the machine operation program simultaneously.

FIGS. 16–19 illustrate flow charts of the program which enables each processor module 18 (FIG. 4) to interpret and process the various types of descriptors. The processing begins at step 590 the top of FIG. 16 with the microprocessor 98 inspecting a list of active descriptor file numbers stored in RAM 106. This active list contains a designation of each descriptor file that is currently being interpreted by the processor module 18. If there are no descriptors listed, the processor module enters a dormant state at step 609 where it remains until it receives a processing command. If the list contains an entry, the top descriptor is gotten off the active list at step 592 and the remaining entries, if any, are moved up in the list. The microprocessor 98 then evaluates the bits which indicate the type of the descriptor. Based upon the type of descriptor, the program at step 600 branches to one of four sections depending upon whether the descriptor is a select, simultaneous, sequence or converge type descriptor. As will be elaborated upon, there are several types of converge descriptors which are evaluated at branch step 607 before branching further to the specific routine for that converge type.

Figure 16:
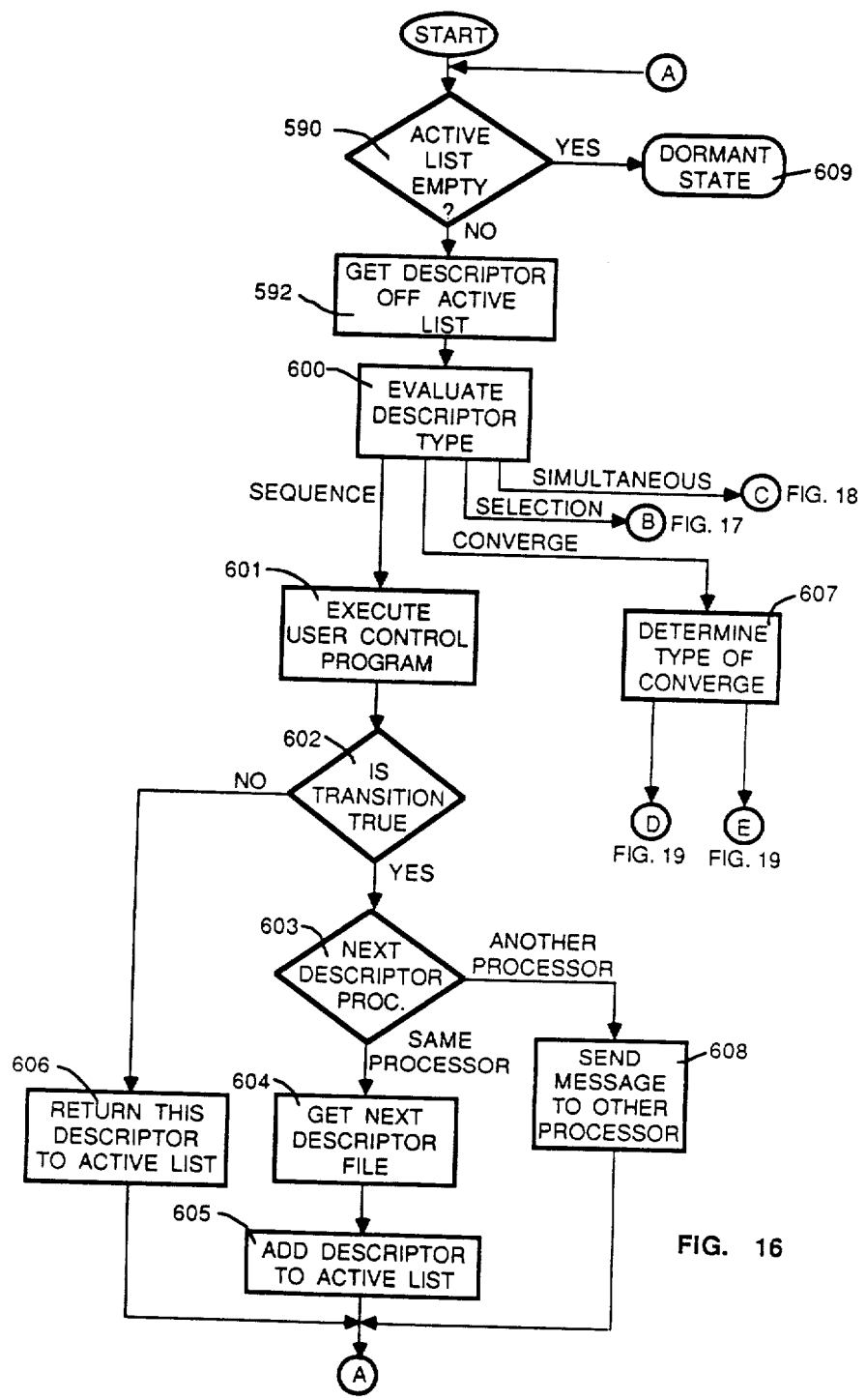
FIGS. 16, 17, 18 and 19 are flow charts of portions of the software for interpreting function chart data and executing user control programs.
Figure 17:
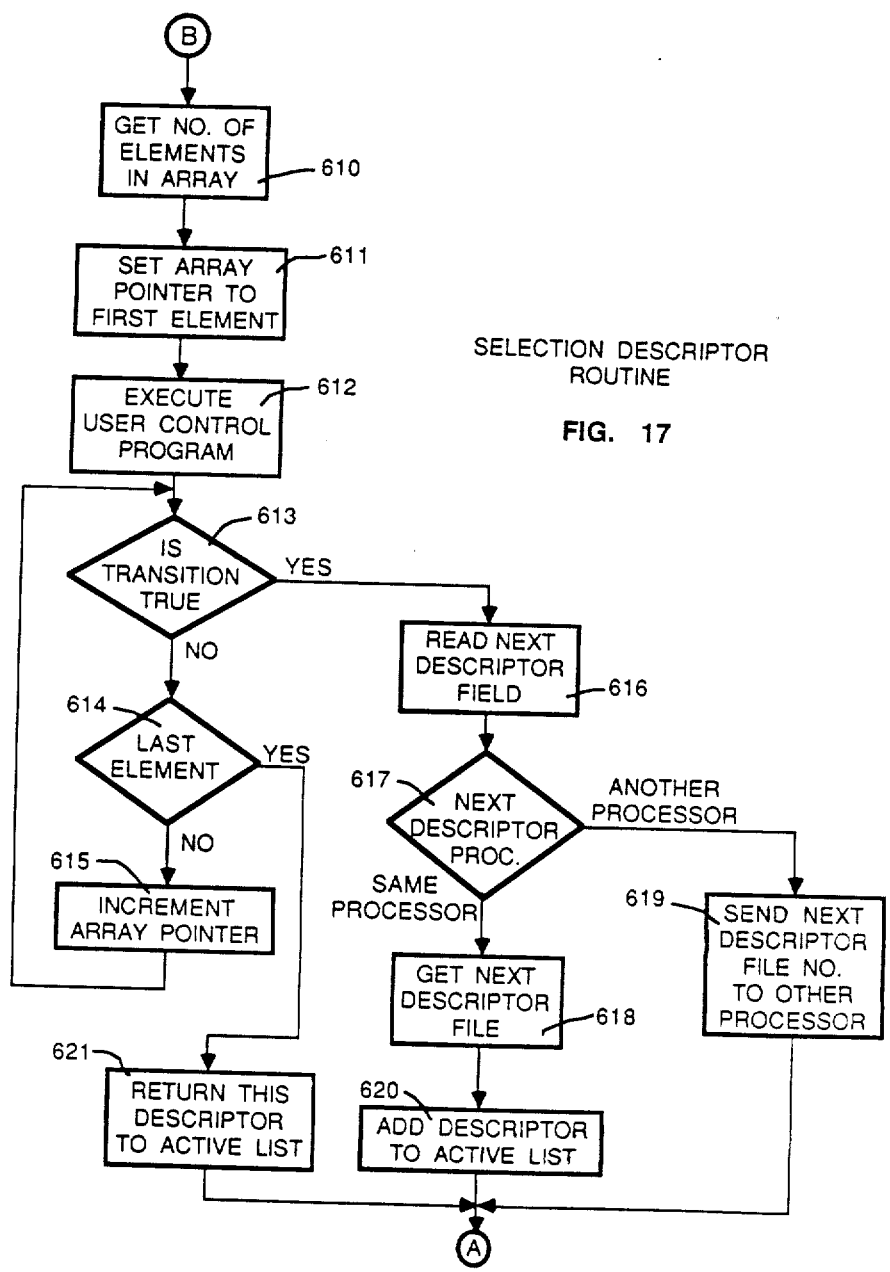
Figure 18:
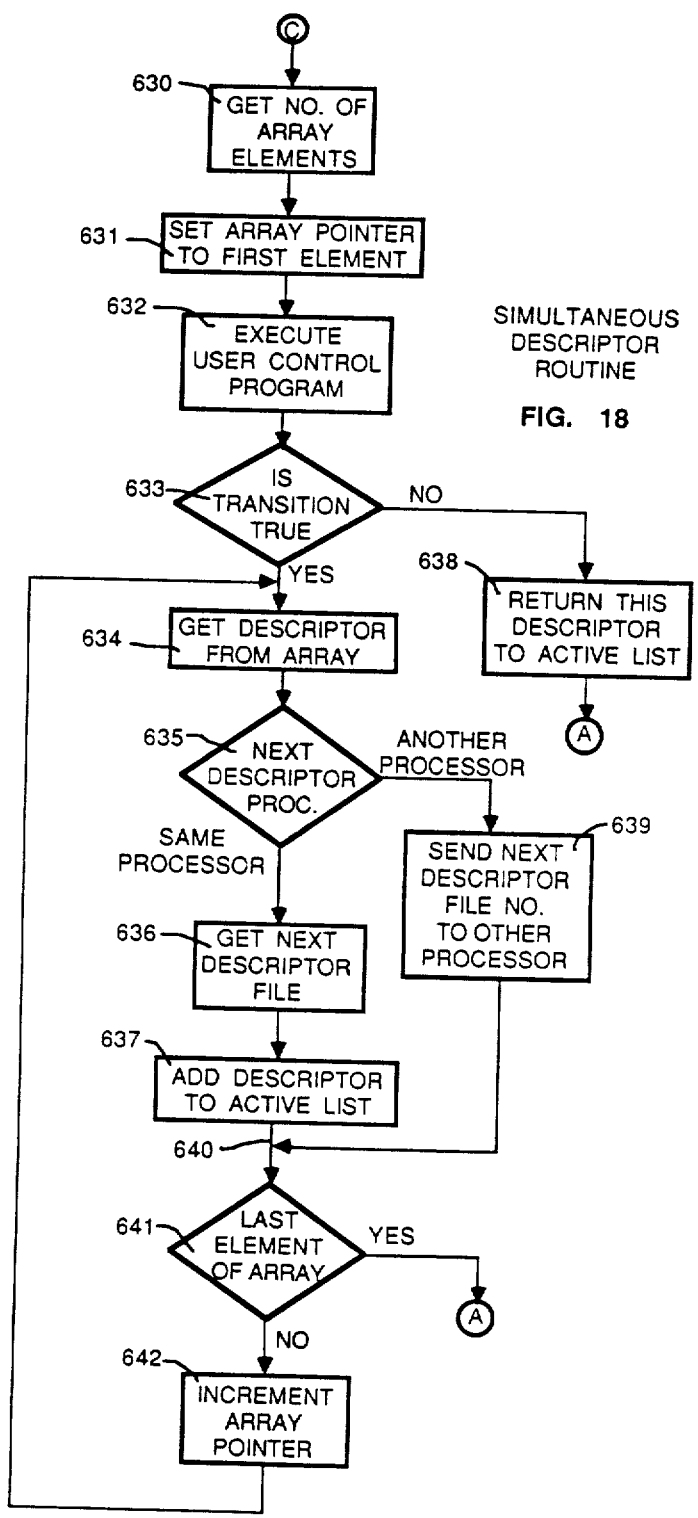
Figure 19:
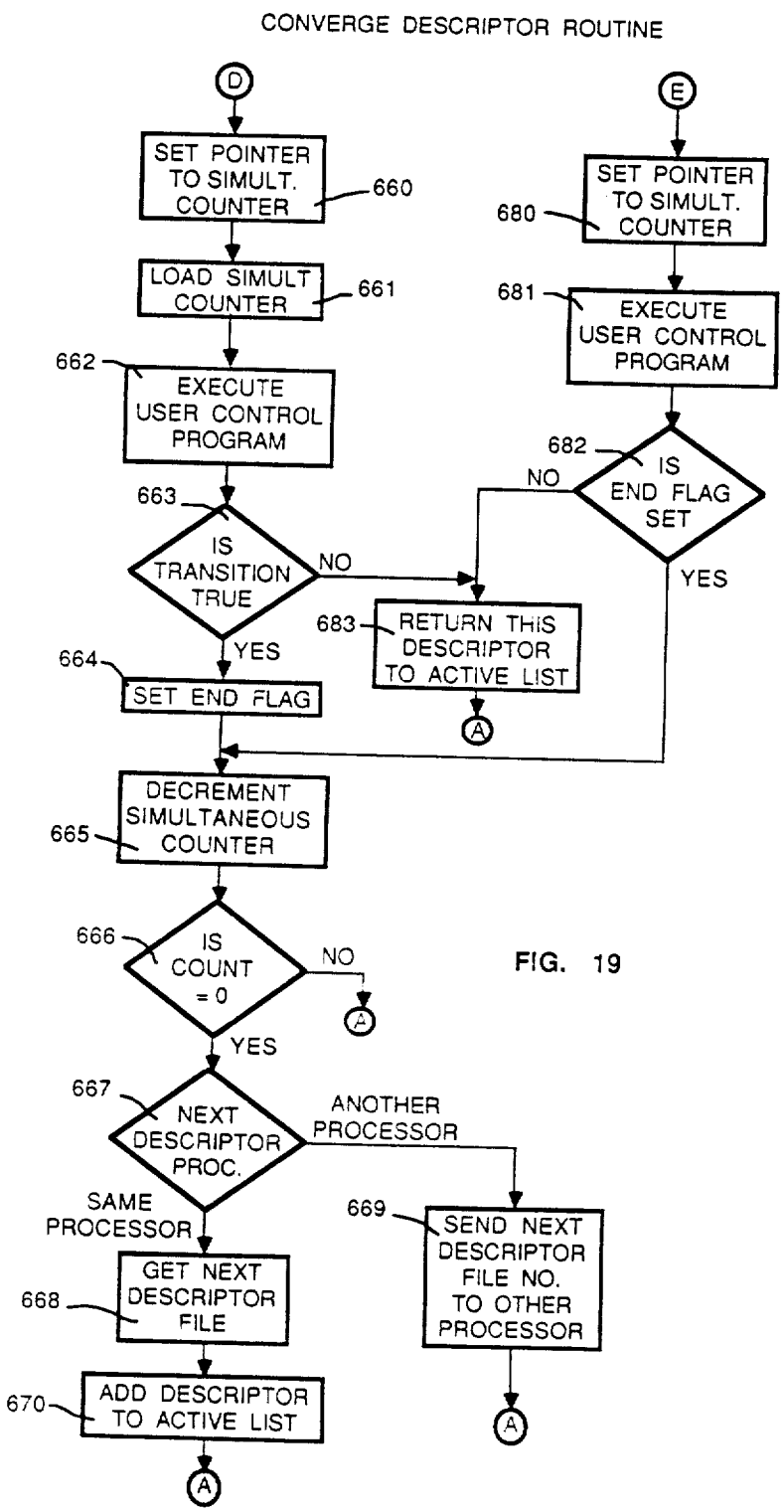

The remaining portion of FIG. 16 is a flow chart for the execution of a sequence type descriptor file which will be described with reference to the first descriptor file 430 in FIG. 11A. This branch routine commences with the processor module P1 at step 601 making one execution scan through the user defined control program specified by the step file number within the descriptor. At the completion of one pass through the ladder program the file containing the transition condition indicated in the descriptor file is executed at decision block 602. If the condition has not happened, the descriptor is returned to the bottom of the active list in the processor RAM 106 at step 606. The program then returns to step 590 to get the next descriptor from the active list. If only one descriptor is on the active list, the same user control program will be immediately executed again. This loop continues until the transition condition has occurred. At this point, step 603, the microprocessor 98 interprets the information within the first descriptor 430 relating to the next descriptor file to determine which program execution processor 18 contains the next descriptor to be interpreted. If the same processor module (P1) is to execute the next descriptor, that descriptor file is obtained from RAM 106 at program step 604 and placed on the active list at step 605. The program returns to step 590 for the microprocessor to check the active list and obtain the next descriptor for processing.

If the next descriptor file is contained in the memory of another processor module 18, a command is sent at step 608 to that processor module via priority mail as described above. The command instructs the other processor module to begin interpreting the next descriptor. Once the information regarding the next descriptor has been transmitted to and acknowledged by the other processor module 18, the previously active processor module 18 goes into a dormant state at point 609 unless other descriptors remain on the active list. In this dormant state a processor module 18 may execute background and other low priority tasks as will be described.

In the exemplary function chart of FIG. 10, the selection construct is processed next by the first processor module P1. As the second descriptor 432 is a selection type the program branches to the routine show in FIG. 17. With reference also to the schematic of the processor module in FIG. 4, the microprocessor 98 at the first step 610 of the routine determines the number of elements in the array of transition condition files. An array pointer address in RAM 106 is set at step 611 to the first element in the transition condition array. The ladder program designated by the step file number in the descriptor 432 is then executed by the processor module P2 at point 612.

At the completion of one scan through the user defined control program, the transition condition contained within the file specified by the first element of the array is evaluated by the microprocessor 98 at step 613 to determine if the condition is met. If the transition has not occurred, the address contained in the array pointer is checked at decision block 614 to determine whether it is pointing to the address in RAM 106 containing the last element of the array. Since it is not the last element, the array pointer is incremented at step 615 and the program returns to decision block 613. The transition condition designated by the next array element is checked at decision block 613. Assuming that none of the transition conditions specified in the array has occurred, this loop continues until the last transition condition in the array has been tested. At this point the execution of decision block 614 indicates that the array pointer is at the address of the last array element and the program advances to step 621 where the descriptor is returned to the bottom of the active list for the processor. The processor module program execution then returns to step 590 (FIG. 16) to process the descriptor at the top of the active list.

The user control program for the select descriptor continues to be executed until such time as one of the transition conditions in the descriptor array has occurred. At which point in time, this transition condition is found to have been met at step 613 and the program branches to step 616. The microprocessor 98 at step 616 reads the array field pointed to by the array pointer which specifies the file number and location of the next descriptor to be processed. A step 617 this next descriptor specification is evaluated. If the next descriptor is stored on the same processor module 18 as the current descriptor, the microprocessor 98 will read the descriptor file from its RAM 106 at process block 618. The program adds the descriptor to the active list at step 620 and returns to step 590 in FIG. 16 to process the next descriptor file.

If the next descriptor is stored in the RAM of another processor module 18 for execution, the program will branch from decision block 617 to step 619 where the current processor module P1 sends a command message by priority mail to the other processor module 18 specifying that it is to "wake up" and begin processing the next descriptor. This message specifies the file number containing the next descriptor. Upon receiving acknowledgment of the command message if the active list is empty, the current processor module P1 enters a dormant state at step 609 until it is notified by another module 18 that it is to resume processing another descriptor.

Referring to the exemplary function chart of FIG. 10, each of the selection branches is represented by a separate sequential type descriptor, the third, fourth and fifth descriptors in FIG. 11A. The transition from whichever one of the selection branches was chosen to the next step 413 is a standard sequential type transition. Specifically, if step 408 was selected for execution, the user control program contained in file 4 will be repeatedly executed until the transition condition 411 contained in file 16 occurs. At this point the program execution transfers to function chart step 413. This transfer will be accomplished by the first processor module P1 sending a priority mail message to the second processor module P2 indicating that it is to commence execution of the sixth descriptor 434 (FIG. 11A).

The second processor module P2 contains a copy of the function chart interpreter program in its local RAM 106. Upon receiving the command message from the first processor module P1, the second processor P2 adds the sixth descriptor 434 to its active list. This action also "wakes up" the second processor module P2, if it was in the dormant state, causing the module to enter its interpreter program at step 590 (FIG. 16). When the second processor module P2 begins execution of the sixth descriptor 434, its function chart interpreter program will determine at step 600 (FIG. 16) that this descriptor is a simultaneous construct type and the program will transfer to the routine indicated by the flow chart of FIG. 18. The first program step 630 in the interpretation of the simultaneous descriptor is the determination of the number of elements in the array of next descriptors which indicates the number of simultaneous function chart steps to be performed. The contents of array pointer address in RAM 106 is then set to the address of the first element at process block 631. The user control program contained in file 6, is then executed by the second processor module P2 at step 632. At the completion of one scan of the control program, the occurrence of the transition condition 414 contained in file 18 is tested at decision block 633. If the condition has not occurred, the descriptor is returned to the bottom of the active descriptor list so that the user control program will be executed again.

When the transition condition 414 has occurred, the processing transfers to commence the execution of the various function chart branches. The first element in the array of next descriptors, descriptor 434, is read from RAM 106 by the microprocessor 98 at block 634 and the processor module 18 for that next descriptor is then determined at block 635. If the module is the same as the current one, the next descriptor is read from RAM 106 at point 636 and in step 637 is added to the processor module's active descriptor list with any other user control program to be simultaneously executed on this processor module.

If one of the next descriptors is to be executed on another processor module (e.g. P1), the descriptor interpreter program branches from decision block 635 to step 639 where the current processor module P2 transmits a command via a priority mail message to that to that other module. The command instructs the other processor module to begin interpreting the descriptor file stored in it. The program then returns to decision block 641 where the microprocessor 98 in the first processor module P1 determines whether the last array element has been processed. If additional elements remain, the contents of the array pointer address are incremented by the microprocessor 98 at step 642 and the next descriptor file number is read from the array at step 634.

This process of evaluating each of the next descriptors continues for each element in the array. Once the last element has been processed by the currently operative processor module P2 at block 641, the program returns to step 590 to check the active descriptor list for more work.

In the exemplary function chart depicted in FIG. 10, the three simultaneous branches, steps 415-417, terminate in a converge construct. The converge construct contains a single transition condition 418 upon the occurrence of which the execution of all the branches ceases. Each branch is represented by a separate descriptor (Descriptors 7-9) stored in the RAM 106 of the processor module P1 or P2 which is designated by the user to perform respective step of the function chart. One of the descriptors, in this example the ninth one 436 (FIG. 11A) contains the transition condition and the next descriptor file number.

The operation of the second processor module P2 will be initially described before discussing the simultaneous operation of the first processor module P1. The ninth descriptor 436 is stored in the second processor module P2. The interpretation of the ninth descriptor 436 begins on at step reading the descriptor from the active list and evaluating its type. For a converge type descriptor the program advances to step 607 where a branching occurs depending upon the particular type of converge descriptor as determined by the microprocessor 98. In this case the converge descriptor contains the transition condition file number and the program advances to node D of the routine shown in FIG. 19. This converge descriptor interpreter routine begins at block 660 by the microprocessor 98 setting a pointer to the address of the simultaneous counter contained within the system support file 203 of the system controller's main RAM 69 (FIG. 7). The first time through the converge routine for a given descriptor, the microprocessor 98 then at step 661 loads the simultaneous counter address with the number of simultaneous branches being executed in this case three. The second processor module P2 then begins execution of the user control program from file 9 at process block 662. At the completion of one pass through the user control program, the microprocessor 98 executes the program in the transition condition file specified in the ninth descriptor file 436. If this transition condition has not occurred, the program replaces the descriptor on the active list and then returns to step 590 (FIG. 16).

However, if the transition condition has occurred, the second processor module P2 at step 664 sets a flag in the system controller RAM 69 indicating the end of the simultaneous execution. While the second module P2 has access to the system controller RAM 69, it decrements the simultaneous counter at step 665 indicating that the processing of its simultaneous branch has been completed. Next at step 666, an evaluation of the counter is made by the second processor module P2 to determine if the counter has reached zero. If the count is not zero the program returns to step 590 (FIG. 16) to see if other descriptors remain to process. As none are left for the second processor P2, it enters a dormant state at step 609.

If all of the simultaneous execution is completed (i.e. the count at step 666 is zero), the second processor module P2 at step 667 examines which processor module is to execute the next descriptor. If the second processor module P2 is to begin executing the next descriptor file, its microprocessor 98 at process block 668 reads the next descriptor and adds it to the active list at step 670. Then the program returns to step 590 at the beginning of the routine in FIG. 16 where it processes the new descriptor. If the next descriptor is to be handled by another processor module (e.g. P1), the routine branches to step 669. The second module P2 sends a priority mail message to that other module P1 informing it to begin executing the next descriptor. Then the second processor module P2 enters the dormant state at step 609.

As previously stated, there are several types of converge descriptors. The descriptors for the branch containing function chart steps 415 and 416 (FIG. 10) do not contain any information regarding the transition condition. These descriptors are stored and interpreted on the first processor module P1. When these descriptors are evaluated by the microprocessor 98 at step 607 of FIG. 16, the program branches to node E of the routine illustrated in FIG. 19. In this routine an address pointer is set at block 680 to the simultaneous counter address in the system controller main RAM 69. The user control program is then executed by the microprocessor 98 at step 681. After each the user control program scan, the end flag address in the system controller main RAM 69 is checked to determine whether or not it has been set, thereby indicating that the control program processing is to terminate. If the flag is not set, the descriptor is returned to that processor's active list at step 683. If the flag is set, the simultaneous counter is decremented twice at step 665 to indicate that the execution of files 7 and 8 by this processor module P1 is ceasing. The first module P1 then at step 666 checks the simultaneous counter and proceeds as previously described with respect to steps 666-670.

As noted above, in addition to the function chart and user control programs the user also may define "background tasks" for a specific processor module 18 to process. These programs are used to perform lengthy non-time critical tasks without an adverse delay in the operation of the function chart control program. User defined background tasks include report generation and certain subordinate control tasks. Report data regarding the performance of controlled equipment may be prepared for transmission via LAN 28 to a host computer. Such reports are not so urgent that the control of the equipment must be suspended while they are prepared and sent. The background control tasks also are used for lengthy calculations which are similar to those found in the main function chart program, but which are not required for real time control.

A background task program may be invoked from a user control program, an interrupt routine such as a selectable timed interrupt, or from another background program. A percentage of the processing time for each processor module 18 has been allocated to performing these background tasks. This percentage is set by the user so that the execution of background tasks do not significantly affect the execution of the machine operation program. Periodically the processing of the user control program is interrupted by the real time clock and the background tasks are performed for a given interval of time. If the end of the background task execution period occurs before the completion of the background program, the execution of the background task will be suspended and resumed during the next background task interval. When a user control program is not being run on the processor module 18, the background task may run almost continuously. In normal operation the background tasks will run intermittently to completion, however, their execution may be aborted by the user control program or upon the occurrence of an error condition.

Because the present programmable controller system has multiple processor modules 18, no single processor is constantly devoted to running the user control programs. This results in time being available for the processor modules to perform background tasks, without such tasks adversely affecting the control of the manufacturing equipment. This is yet another benefit of the present parallel processing concept as applied to programmable controllers.

What is claimed is:

1. A programmable controller for operating a machine to carry out a plurality of programmed functions, which includes a plurality of modules connected to a common backplane, the common backplane having a plurality of conductors for carrying data address and control signals among the modules, each module comprising:
   means for obtaining access to the backplane to transmit data messages to another module; and
   means for storing message data from another modules, said storage means having a first set of addressable storage locations with a storage location designated for each other module.

2. The programmable controller as recited in claim 1 wherein each of said functional modules further comprises an interrupt means for indicating when another module has stored information in one of the storage locations in said storing means.

3. The programmable controller as recited in claim 1 wherein said means for storing has a second set of addressable storage locations with a storage location designated for each other module.

4. The programmable controller as recited in claim 3 wherein each of said modules further comprises:
   a first interrupt means for indicating when another module has stored data in the first set of storage locations; and
   a second interrupt means for indicating when another module has stored data in the second set of storage locations.

5. The programmable controller as recited in claim 4 wherein each of said modules further comprises means for processing the data stored in the first set of storage locations substantially immediately in response to an indication from said first interrupt means.

6. The programmable controller as recited in claim 5 wherein each of said modules further comprises means for processing the data stored in the second set of storage locations in response to an indication from said second interrupt means.

7. The programmable controller as recited in claim 1 where data stored in the first set of locations comprises either executable commands or pointers to a memory location containing additional data about the message, said programmable controller further comprising:
   means for determining whether the message data is an executable command or a memory pointer;
   means responsive to said determining means for executing the executable commands; and
   means responsive to said determining means for utilizing said memory pointer to access the data message.

8. In a programmable controller for operating a machine to carry out a plurality of programmed functions, having a plurality of processing means each being operable to execute a control program that directs the programmable controller to operate the machine to perform a specific function, and having means for electrically interconnecting the plurality of processing means to enable sending messages between such processing means, each of said processing means comprising:
   a first set of storage locations for receiving messages of a first type, each of the storage locations in said first set designated to receive messages from a different one of the other processing modules, and
   a second set of storage locations for receiving messages of a second type, each of the storage locations in said second set designated to receive messages from a different one of the other processing modules; and
   means for transmitting messages of both types from that processing means to other processing means.

9. The programmable controller as recited in claim 8 wherein each of said processing means further comprises an addressable interrupt means for indicating when data has been stored in one of the storage locations in said first and second sets.

10. The programmable controller as recited in claim 8 wherein each of said processing means further comprises a first addressable interrupt means for indicating when a message has been stored in one of the first set of storage locations, and a second addressable interrupt means for indicating when a message has been stored in one of the second set of storage locations.

11. A programmable controller for operating a machine to carry out a plurality of programmed functions, which comprises:
   a plurality of processing means each being operable to execute a control program that directs the programmable controller to operate the machine to perform a specific function, each of said processing means including:
   a first set of storage locations for receiving messages containing program execution commands, each of the storage locations in said first set designated to receive messages from a different one of the other processing modules, and
   a second set of storage locations for receiving messages related to the transfer of data, each of the storage locations in said second set designated to receive messages from a different one of the other processing modules;
   means for storing a plurality of control programs and function chart data; and
   means responsive to the function chart data for controlling the sequence in which the control programs are executed and for sending program execution commands to the first set of storage locations in another processing means.

* * * * *

UNITED STATES PATENT AND TRADEMARK OFFICE
CERTIFICATE OF CORRECTION

PATENT NO. : 4,876,664

DATED : October 24, 1989

INVENTOR(S) : Bittorf, Bradley J. et al.

It is certified that error appears in the above-identified patent and that said Letters Patent is hereby corrected as shown below:

In column 6, line 15 change "by" to --be--.

In column 11, line 67 through column 12, line 12 delete the text beginning with "sixteen uses. The memory ..." and concluding with "... gate 116 couple the".

In column 13, line 48, after "consists of three" insert --separate sections 212-214. The first section 212 is the--.

In column 20, line 22, change "module s" to --module's--.

In column 31, line 41, after "step" insert --590 Figure 16 with the processor module's microprocessor 98--.

In column 33, line 41, change "another" to --other--.

Signed and Sealed this

Twenty-second Day of January, 1991

Attest:

HARRY F. MANBECK, JR.

*Attesting Officer*     *Commissioner of Patents and Trademarks*